US011165724B2

(12) United States Patent
Adams

(10) Patent No.: US 11,165,724 B2
(45) Date of Patent: Nov. 2, 2021

(54) METHOD AND PERSONAL EMAIL SYSTEM USING SIMULATED VIRTUAL USERS

(71) Applicant: Email Data Source, Inc., New York, NY (US)

(72) Inventor: Christopher Thomas Adams, Kansas City, MO (US)

(73) Assignee: Email Data Source, Inc., New York, NY (US)

( * ) Notice: Subject to any disclaimer, the term of this patent is extended or adjusted under 35 U.S.C. 154(b) by 75 days.

(21) Appl. No.: 16/654,605

(22) Filed: Oct. 16, 2019

(65) Prior Publication Data

US 2020/0120047 A1 Apr. 16, 2020

Related U.S. Application Data

(60) Provisional application No. 62/746,335, filed on Oct. 16, 2018.

(51) Int. Cl.
*G06F 15/16* (2006.01)
*H04L 12/58* (2006.01)
*H04L 29/08* (2006.01)

(52) U.S. Cl.
CPC .............. *H04L 51/02* (2013.01); *H04L 51/18* (2013.01); *H04L 51/20* (2013.01); *H04L 67/22* (2013.01); *H04L 67/306* (2013.01)

(58) Field of Classification Search
CPC ......... H04L 51/02; H04L 51/18; H04L 51/20; H04L 67/22; H04L 67/306
USPC ......................................................... 709/206
See application file for complete search history.

(56) References Cited

U.S. PATENT DOCUMENTS

| | | | |
|---|---|---|---|
| 2017/0076317 A1* | 3/2017 | Gillaspie | G06Q 10/107 |
| 2019/0334947 A1* | 10/2019 | Govardhan | G06F 21/552 |
| 2019/0378074 A1* | 12/2019 | Mcphatter | G06Q 10/0637 |
| 2020/0090210 A1* | 3/2020 | Weldemariam | G06Q 30/0244 |

* cited by examiner

*Primary Examiner* — Alan S Chou
(74) *Attorney, Agent, or Firm* — Larry J. Guffey, Esq.; Oliver & Grimsley, LLC

(57) ABSTRACT

A system includes simulated virtual users that are generated to register for personal email accounts. The virtual users are generated using behavior, demographic, and sociographic profiles. The email accounts receive and interact with email using a server and a simulator according to profile data for the simulated virtual users. The interactions are monitored to determine and simulate deliverability and other information for the personal email accounts. Further, the server and simulator are specific to a certain country or location to act as users in those locations.

20 Claims, 14 Drawing Sheets

METHOD AND PERSONAL EMAIL SYSTEM USING SIMULATED VIRTUAL USERS

FIELD OF THE INVENTION

The present invention relates to determining and analyzing information about the effectiveness of electronic mail delivery using email accounts based on simulated virtual users.

BACKGROUND OF THE RELATED ART

Emails may be sent to a large number of recipients for a variety of reasons. Advertising, campaigns, awareness, school/education and the like use bulk marketing email to get messages and information out quickly. Many emails, however, may not be received or routed to an account's spam folder. Further, many email accounts lie dormant or rarely used by a user.

Traditional methods of monitoring email delivery, such as email "seeds," can no longer effectively monitor the complex environments at the major email providers, such as Google™, Gmail™, and Microsoft Outlook™. For example, senders or third-party providers may maintain a list of email addresses (seed accounts) at different internet and email providers. These addresses are then added to the senders' email list and used to determine if the email campaign was delivered to the inbox or the spam folder. One major drawback to using a seed-only approach is that most major internet server providers (ISPs) are able to determine that the accounts in question do not belong to actual users. They do not send email or behave like a normal email account. For example, seed accounts do not open email, click email links, reply to emails, or provide similar other actual user behavioral events. As a result, ISPs often deliver email to seed accounts differently than actual user accounts.

Another method of monitoring email delivery is based upon the monitoring associated with actual human consumers of the email campaign. A drawback to relying upon consumer email data is that, as the privacy landscape becomes stricter, internet and email providers are restricting access to the email data that is allowed to be aggregated and shared. As more internet and email providers restrict access, live consumer data for the purposes of monitoring email will continue to be a less-viable option.

SUMMARY OF THE INVENTION

As the panel approach becomes less feasible due to privacy concerns, user interaction with email must be replicated to accurately determine the effectiveness of email campaigns. A company needs to be able to determine whether emails are being delivered to the inbox or diverted to spam. The disclosed embodiments relate to a predictive personal email system using virtual users or personas that mimic actual user's behavior in reading, deleting, ignoring emails, clicking links within the email, sending and forwarding emails, and the like. A group of virtual personas are created to act like a group of actual users that replicate panel information not currently available. Holistic and realistic information is compiled and analyzed for effective email campaigns. For example, use of the disclosed processes may provide hundreds of different personalities for simulated users that react differently when taking actions on a received email.

A method for using a plurality of virtual users for email accounts of a personal email system to predict actions that are taken on personal email is disclosed. The method includes generating a set of behavior profiles based on a population of users. The set of behavior profiles have a probability of an email activity occurring for a received email. The method also includes creating a set of user profiles using a plurality of demographic profiles and a plurality of sociographic profiles. The method also includes generating a plurality of simulated virtual users. Each simulated virtual user includes a user profile with a demographic profile and sociographic profile that acts according to a behavior profile. Each behavior profile, each demographic profile, and each sociographic profile forms part of multiple simulated virtual users. The method also includes assigning a personal email account to a simulated virtual user of the plurality of simulated virtual users. The method also includes identifying a plurality of lists to register the personal email account of a simulated virtual user using a simulated virtual user list registration processor network. The method also includes receiving an email at the personal email account from one of the plurality of lists. The method also includes simulating email activity for the email received at the personal email account according to the corresponding behavior profile and the user profiled for the simulated virtual user associated with the personal email account.

A personal email system using a plurality of virtual users for email accounts is disclosed. The personal email system is configured to generate a set of behavior profiles based on a population of users. The set of behavior profiles have a probability of an email activity occurring for a received email. The personal email system also is configured to create set of user profiles using a plurality of demographic profiles and a plurality of sociographic profiles. The personal email system also is configured to generating a plurality of simulated virtual users. Each simulated virtual user includes a user profile with a demographic profile and a sociographic profile that acts according to a behavior profile. Each behavior profile, each demographic profile, and each sociographic profile forms part of multiple simulated virtual users. The personal email system also is configured to assign a personal email account to a simulated virtual user of the plurality of simulated virtual users. The personal email system also is configured to identify a plurality of lists to register the personal email account of a simulated virtual user using a simulated virtual user list registration processor network. The personal email system also is configured to receive an email at the personal email account from one of the plurality of lists. The personal email system also is configured to simulate email activity for the email received at the personal email account according to the corresponding behavior profile and the user profile for the simulated virtual user associated with the personal email account.

A method for using a virtual user associated with a personal email account to simulate email activity using an engagement simulator processor network server for a location is disclosed. The method includes generating a user profile for the virtual user. The user profile includes a combination of a behavior profile, a demographic profile, and a sociographic profile. The method includes creating the personal email account for the virtual user using the engagement simulator processor network server. The personal email account includes an address corresponding to the location of the engagement simulator processor network server. The method also includes receiving an email from an email list to the personal email account at a simulated virtual user processor network server. The method also includes determining whether to deliver the email to the personal email account by the simulated virtual user email processor network server. The method also includes determining whether to read the email at the personal email account using the behavior profile of the user profile. The method also includes simulating email activity for the email according to the user profile. The engagement simulator processor network server collects data for the email activity A method for using a plurality of virtual users for actual email accounts of a predictive personal email system is disclosed. The method includes generating a set of behavior profiles based on a population of users. The set of behavior profiles have a probability of an email activity occurring for a received email. The method also includes creating a set of user profiles using a plurality of demographic profiles and a plurality of sociographic profiles. The method also includes generating a plurality of simulated virtual users. Each simulated virtual user includes a user profile with a demographic profile and a sociographic profile that acts according to a behavior profile, such that each behavior profile, each demographic profile, and each sociographic profile forms part of multiple simulated virtual users. The method also includes finding a plurality of email accounts to register each simulated virtual user using a simulated virtual user list registration processor network. The method also includes receiving an email at each of the plurality of email accounts. The method also includes simulating email activity for the email sent to each of the plurality of email accounts according to the behavior profile and the user profile for the simulated virtual user associated with the email account.

A method for generating an email account for a simulated virtual user is disclosed. The method includes creating a plurality of profiles based on different types of data related to email behavior and parameters. The method also includes generating a simulated virtual user based on the plurality of profiles. The method also includes registering the simulated virtual user for an email account using a processor network for a specific location for the virtual user. The email account receives an email from a real-world sender.

A method for analyzing a virtual user having an email account is disclosed. The method includes receiving an email at an email account. The email account is associated with a simulated virtual user having profile data. The method also includes interacting with the email using a simulator based on the profile data for the virtual user. The simulator is associated with a specific geographic location. The method also includes monitoring the interaction with the email using a processor network.

A system to generate an email account for a simulated virtual user is disclosed. The system is configured to create a plurality of profiles based on different types of data related to email behavior and parameters. The system also is configured to generate a simulated virtual user based on the plurality of profiles. The system also is configured to register the simulated virtual user for an email account using a processor network for a specific location for the virtual user. The email account receives an email from a real-world sender.

A system to analyze a virtual user having an email account is disclosed. The system is configured to receive an email at an email account. The email account is associated with a simulated virtual user having profile data. The system also is configured to interact with the email using a simulator based on the profile data for the virtual user. The simulator is associated with a specific geographic location. The system also is configured to monitor the interaction with the email using a processor network.

BRIEF DESCRIPTION OF THE DRAWINGS

The accompanying drawings are included to provide further understanding of the disclosed embodiments and constitute a part of the specification. The drawings listed below illustrate embodiments of the claimed invention and, together with the description, serve to explain the principles of the invention, as disclosed by the claims and their equivalents.

DETAILED DESCRIPTION OF THE PREFERRED EMBODIMENTS

Figure 1A:
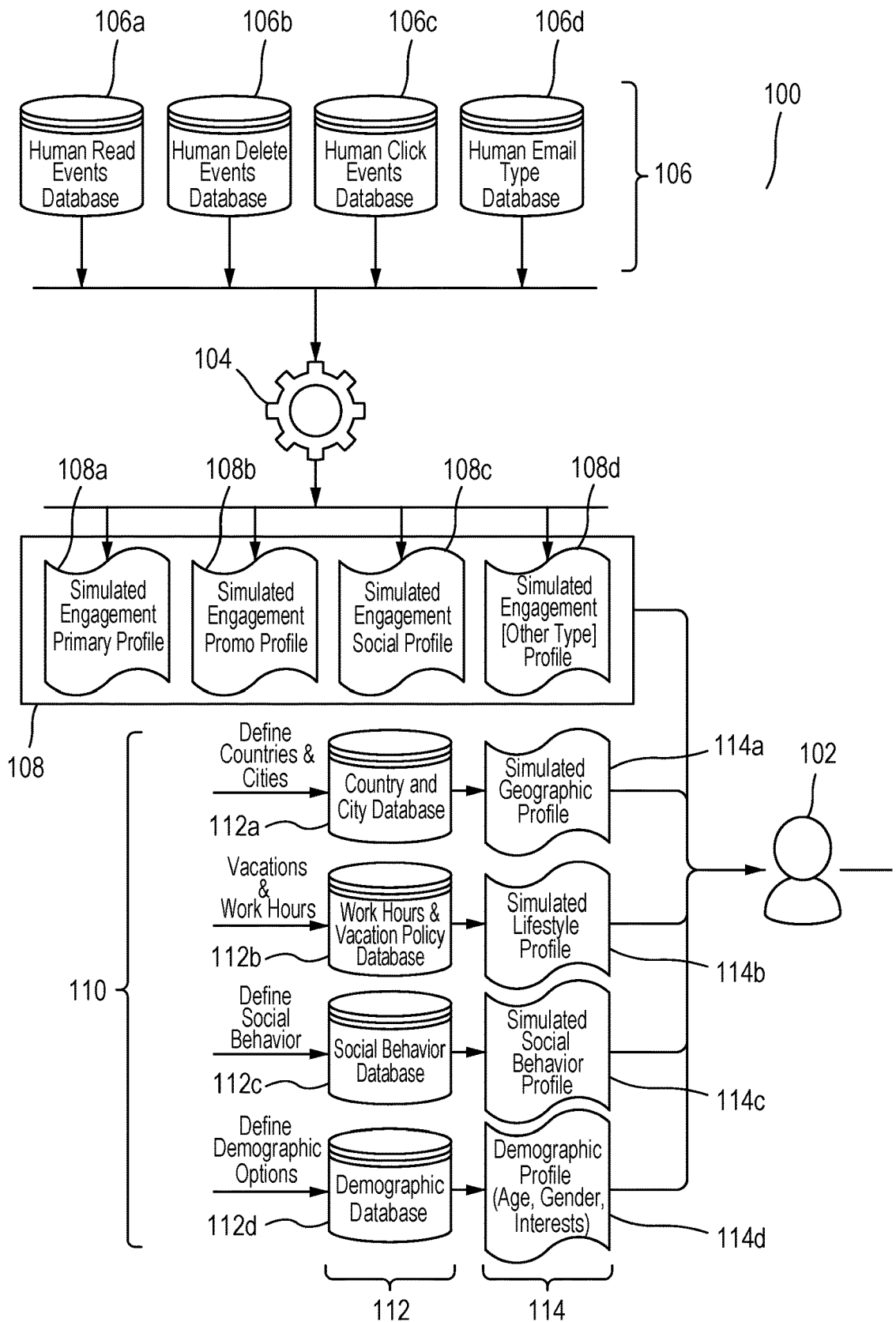
FIG. 1A illustrates a system for email communication using email accounts for simulated virtual users according to the disclosed embodiments.

Aspects of the invention are disclosed in the accompanying description. Alternate embodiments of the present invention and their equivalents are illustrated without parting from the spirit or scope of the present invention. It should be noted that like elements disclosed below are indicated by like reference numerals and the drawings.

There is a need for a system that can accurately monitor and predict email deliverability within the complex and ever-shifting landscape of privacy regulations (such as GDPR) on the internet and at major internet service providers who use dynamic and user-specific algorithms in determining to deliver email to consumers. Thus, a method and system for monitoring email deliverability of electronic mail is provided using simulated virtual users. These virtual users act as a regular email account user would act. The disclosed embodiments create simulated virtual users based upon the behavior and patterns of actual consumers when interacting with electronic marketing communications. The simulated users will read, delete, and forward emails based upon the behavior of "real-world" users of email accounts.

The disclosed embodiments assign demographic information, such as home addresses, purchase behaviors, ages, genders, and consumer sentiment patterns based upon millions of actual email account users and their observed behavior patterns when interacting with the accounts. The disclosed embodiments register virtual users for real email accounts at ISPs within specific locations across the globe in order to simulate geographic differences between users. The disclosed embodiments also assign engagement profiles to the simulated users that simulate actual user behavior, including the manner in which users' read and delete email as well as purchase from online or ecommerce vendors, websites, services, and the like.

The disclosed embodiments also simulate the personal email accounts having a virtual user with "friends" and email communication that takes place amongst different peer groups and users, including sending emails and replying to emails from friends. The disclosed embodiments simulate user work and lifestyle patterns, including vacation patterns, work hours, sleeping periods, and the like, as well as those times that users are more likely to engage with managing their account email boxes.

The disclosed embodiments also use an automated process to register the virtual accounts with individual brands and email lists for companies. Further, the disclosed embodiments provide senders with a listing of email addresses to include in their own recipient email lists. The disclosed embodiments include a user-engagement simulator, or processor, that is deployed to computer processing systems across the globe. The user-engagement simulator simulates user behavior based upon the previously defined real-world models of user behaviors assigned to the virtual users. The disclosed method and system include a processing system that monitors for new email arrival. The disclosed embodiments then determine and communicate the email campaign information, including the deliverability information for the newly arrived message, to additional downstream data processors.

Figure 1B:
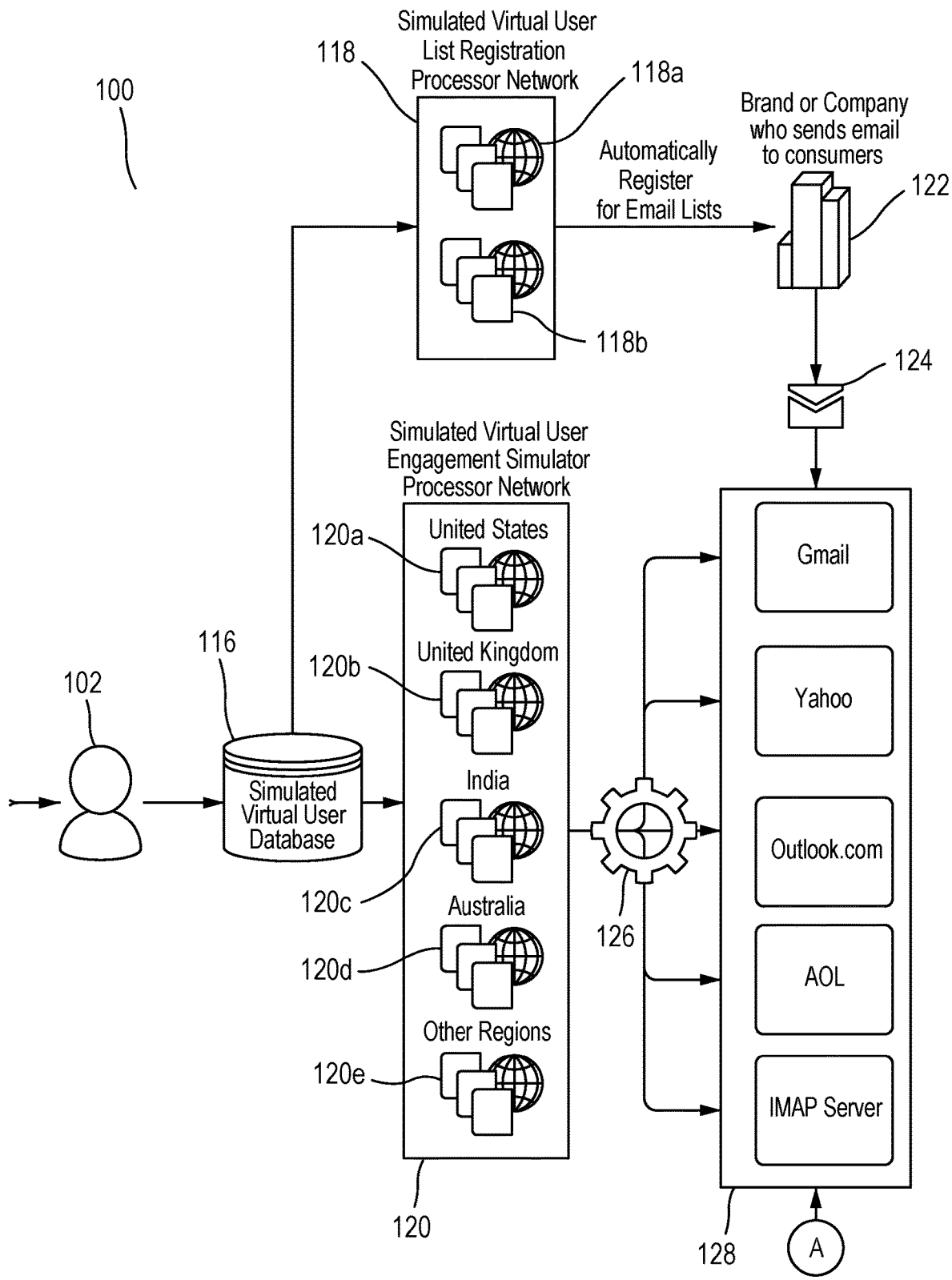
FIG. 1B also illustrates the system for email communication using email accounts according to the disclosed embodiments.
Figure 1C:
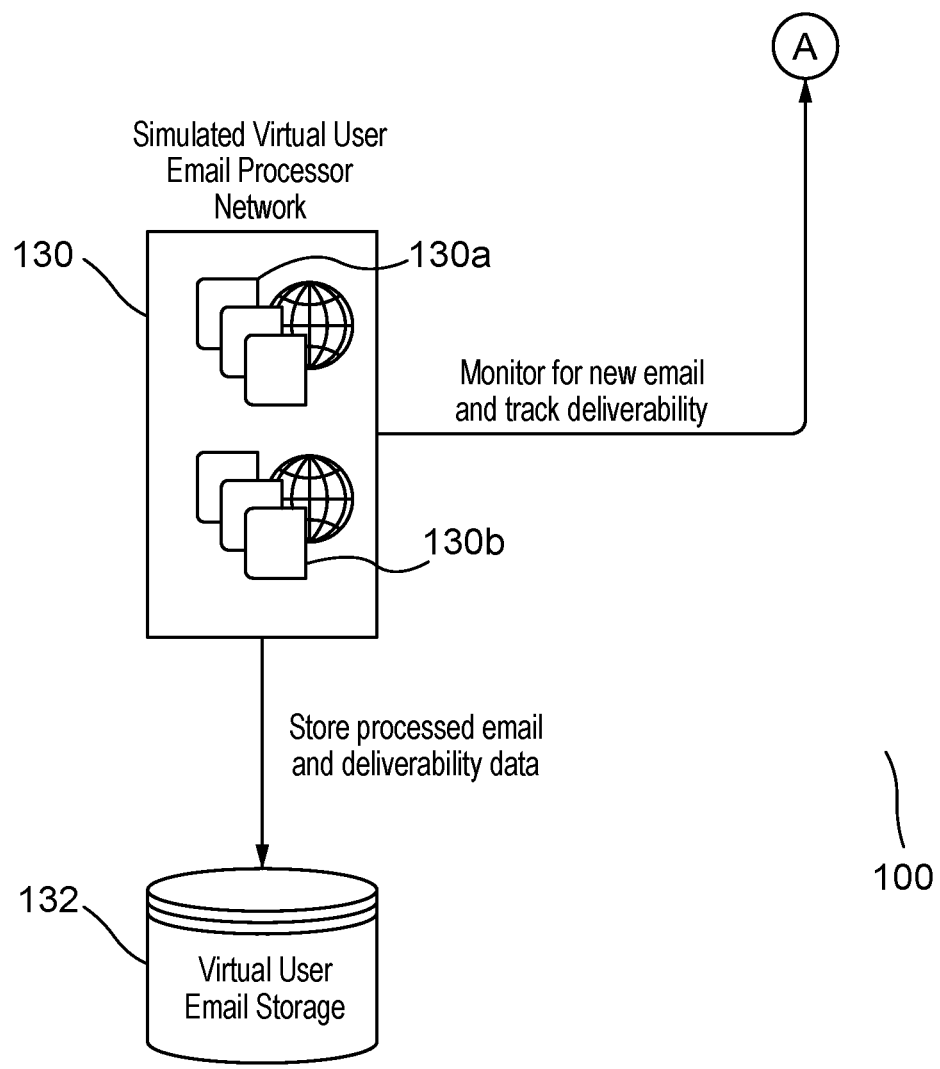
FIG. 1C illustrates the system for storing email communication using email accounts according to the disclosed embodiments.

FIGS. 1A-C depict a system 100 for analysis of email communication using virtual users according to the disclosed embodiments. A simulated virtual user 102 is generated based on the combination of simulated profiles, disclosed in greater detail below. Although FIGS. 1A and 1B show a single virtual user, a plurality of virtual users 102 may be generated, each using the combination of simulated profiles, but with at least a few being slightly different than others. Simulated virtual user 102 then stored in a simulated virtual user database 116 and used to engage with networks 118 and 120 to simulate an actual email account. The results and pertinent data from these engagements is stored in simulated virtual user email storage 132. This process is disclosed in greater detail below and in FIGS. 1A-C.

System 100 utilizes large amounts of data to create simulated profiles that are used in generating virtual users 102. The databases disclosed below include data collected from millions of instances of email actions and user behavior over a period of time, preferably the last 5 years. Millions of data points are stored within the databases, each pertaining to a segment of the use of an email account. This data may be stored in human events databases 106. The databases may store information related to interactions normally performed by a human using an email account.

Human read events database 106a stores information regarding how users read their emails. This information may include how many emails are read and so on. Human delete events database 106b stores information regarding how users delete emails or messages from their accounts. Some users may delete every email or have default setting to delete emails after a period of time, such as 90 days. Other users never delete their emails. This information is captured in database 106b.

Human click events database 106c stores information regarding how often users click on links or attachments in an email. Certain patterns may emerge on what types of emails are engaged by the users. Further, emails delivered to corporate accounts may not show a click on an embedded link due to security concerns. This information captures this behavior. Human email type database 106d stores information regarding the types of emails or accounts that people normally use and how much interaction within the account mailbox does one do. Additional human events databases 106 may be used or the databases shown in FIG. 1A may be further divided into separate data storage locations.

Behavior profiles 104 are generated using the information from databases 106. This process is disclosed in greater detail below. The behavior profile models the probability that percentiles of the population will perform an activity upon receipt of an email. The probability may be influenced by information provided for the population in the databases 106. Further, behavior profiles 104 are updated based on criteria updated in the databases. Thus, the disclosed embodiments use machine learning modeling to generate the behaviors profiles.

The actions modeled in behavior profiles 104, for example, may include delete, read, click, or do nothing. For a certain percentile of the population, the probability of a user taking one of these actions differs. The use of the percentiles allows for variations to occur in generated simulated users 102. For example, instead of having 50% of emails will be deleted for a population, the disclosed embodiments may have a 10% probability for deleting the email for a certain percentile of the population and a 30% probability for another percentile. Further, the disclosed embodiments adjust these percentiles based on factors that change periodically.

For example, a brand may initiate an email campaign to promote its products in its online store. The initial campaign may have a high percentage of a probability of reading the email but a low percentage of clicking a link in the email on a certain date. As days go by to an important event, such as Black Friday or Cyber Monday during the holiday season, these probabilities change. The probabilities of being read may stay the same but the probabilities of a link being clicked may rise substantially for certain percentiles of the population. Other percentiles may not change at all. Such simulated user behavior is used to guide the actions of the simulated user having an email account.

Behavior profiles 104 create simulated engagement profiles 108. Behavior profiles 104 use the simulated behavior therein to generate and categorize potential users into engagement profiles. In other words, analysis, or machine learning, behavior profiles 104 retrieve human events data points to generate the profiles such that they represent actual users of email. Behavior profiles 104 receive inputs as specified for virtual user behavior and outputs tendencies for a virtual user. Behavior profiles 104 may modify its algorithms as databases 106 are updated are changed. Further, behavior profiles 104, in some embodiments, may access data from simulated virtual user email storage 132 to use results of system 100 to update its algorithms and probabilities for creating virtual profiles.

Simulated engagement profiles 108 generated by analysis module 104 reflect behavior of how a virtual user will engage an email account. Thus, simulated engagement primary profile 108a may simulate user behavior on interacting with the primary account, such as reading and replying to emails. These emails may be "work-related" or personal emails. Simulated engagement promo, or promotion, profile 108b simulates how the user of the virtual account will react to promotions delivered to the account, such as coupons, marketing materials, and the like. Some email accounts have a separate sub-mailbox for promotions, which keeps commercial emails apart from personal ones. Some users rarely, if ever, interact with the promo emails, while others view and interact with them daily. Profile 108b reflects this behavior.

Simulated engagement social profile 108c simulates the behavior of the virtual user with regards to social media emails. Most social media platforms send periodic emails providing summaries of activities on the user's social media account. Other platforms send an email any time an interaction occurs on the social media platform. The disclosed embodiments support setting engagement characteristics on the following types of messages: forums, personal, promotions, social, and updates. For example, if someone comments on a post on one's profile, then an email is sent to the user with the comment. Some users may then click a link in the email to be taken to the social media platform. Profile 108c models this behavior for virtual user 102.

Simulated engagement other type profile 108d may simulate other behavior not related to primary email actions, promotions, or social media platforms. Such behavior may be whether the virtual user checks the spam folder or indicates that certain emails are "important" or starred, thereby saved for retrieval later as part of the indicated category. Additional profiles 108 also may be generated by analysis module 104 to simulate actions by a virtual user of a virtual email account.

In some embodiments, profiles 108a-d may be combined to form a single behavior profile 104 for a simulated user. This feature is disclosed in greater detail below.

Simulated demographic and sociographic profiles 114 also are used in generating virtual users 102 according to the disclosed embodiments. Simulated profiles 114 differ from simulated engagement profiles 108 in that the behavior reflected therein pertains to other actions apart from email engagement. The profiles include hard data for the simulated users.

Parameters 110 may be defined for the virtual user of virtual user account 102 and stored in databases 112. Parameters may include countries, cities, states, or other geographic information, which is stored in country and city database 112a and vacations and work hours stored in database 112b. The location of a user may determine those times of the day that an email account is accessed. Work hours and vacations also provide indications of when email is checked and read. Virtual user account 102 will use this information in interacting with networks 118 and 120.

Parameters 110 also may include defined social behavior that is captured in social behavior database 112c. Social behavior may include when the virtual user is out and busy, such as Friday evenings and Sunday afternoons. Demographic options are defined as well in demographic database 112d. Virtual user account 102 should reflect demographics of interest or all demographics to provide a balance analysis of email delivery. Some demographics, such as older adults or, increasingly, younger teens, do not use email at all or very rarely. A virtual user of a student having an age of 20 will behave differently than a professional virtual user of 45. Database 112d stores the different demographics available for virtual email accounts 102.

Simulated profiles 114 are generated based on the information provided by databases 112. Using the information provided related to parameters 110 provided for virtual users, profiles 114 include simulated demographic geographic profile 114a, simulated sociographic lifestyle profile 114b, simulated sociographic social behavior profile 114c, and simulated demographic profile 114d, which includes age, gender, and interests. Thus, the disclosed embodiments generate demographic profiles and sociographic profiles for virtual users. These processes are disclosed in greater detail below.

Profiles 108 and 114 are combined to generate a virtual user 102. The different profiles may dictate how the virtual user 102 acts upon receipt of email. As much as possible, actual human behavior is simulated. One feature of the virtual user is that it is not related to an actual user. No privacy concerns arise as a real account is not being used. Further, any number of virtual users 102 may be generated automatically without the need for deciding how the virtual user should act.

Virtual user 102 then models behavior and interaction with email providers and networks. Referring to FIG. 1B, simulated virtual user 102 is stored in simulated virtual user database 116. System 100 registers the simulated users in database 116 within brands/companies 122 and email platforms 128. Simulated virtual users 102 may be sent to simulated virtual user list registration processor network 118. Processor network 118 may be a processor executing instructions to register the virtual users. In some embodiments, processor network 118 is a bot that finds email lists in which to register using the information for simulated virtual users 102.

Processor network 118 automatically registers virtual users 102 for email lists. This process is disclosed in greater detail below. The email lists may be for brands, or companies, 122 that send emails 124 to consumers to promote their products or services. Other lists may send information on specific topics, such as a trade organization or firm in an industry. For example, a law firm may send monthly emails on legal topics. Processor network 118 may register virtual users 102 for any of these.

Processor network 118 includes proxy servers 118a and 118b. Proxy servers 118a and 118b register the email account for virtual user 102 in the location for the user. For example, proxy server 118a may act like a server in Germany if the virtual user includes demographic information that states it is German. The request to register for emails lists is routed to the appropriate proxy server within processor network 118. The email address of the virtual user is placed in the country of proxy server 118a. Further, processor network 118 may include servers that review the demographic or other information to determine which email lists to register.

Simulated virtual user engagement simulator processor network 120 also accesses simulated virtual user database 116 to mirror the virtual users in different geographic locations. This process is disclosed in greater detail below. Email service providers 128 may treat accounts differently depending on their location. Thus, network 120 may have actual servers located in different countries or locations in order to register virtual accounts from that location. The servers within engagement simulator processor network 120 may not be proxy servers. Instead, the servers for processor network 120 may be actual servers, such as Amazon™ EC2 instances running in the specified region. These permanent servers will conduct the actual engagement based on the user profile for virtual user 102.

Referring to engagement simulator processor network 120, server 120*a* may be located in the United States, server 120*b* may be located in the United Kingdom, server 120*c* may be located in India, server 120*d* may be located in Australia, and servers 120*e* may be located in other regions. These servers allow the email address to have an internet protocol (IP) address from that region. Further, brands and companies 122 will think the email address is in the country where the servers of processor network 120 are located.

Simulator 126 determines which messages to read, delete, forward, click, reply to, and the like, based on the profile for virtual user 102. Simulator 126 may receive information and data from the appropriate server in processor network 120. Virtual user 102 may register for one or more accounts with email service providers 128, as disclosed above. Once the account is created, virtual user 102 interacts with that account according the behavior set forth in the user profile. Profiles 108 and 114 are used to determine when and how virtual user 102 interacts with the account. This process is disclosed in greater detail below.

An email 124 is sent from brand or company 122 to the accounts with providers 128. Email 124 may be initially received by simulated virtual user email processor network 130. Processor network 130 may comprise a plurality of processors that monitor and track deliverability for new email. Processor network 130 may determine whether or not to deliver email 124 or place it in a spam folder. It also stores the email and any metadata at virtual user email storage 132.

Email processor network 130 includes servers 130*a* and 130*b*. These servers may be Amazon™ Web Service (AWS) servers to provide a secure cloud services platform. Like the servers in processor network 120, the servers in email processor network 130 execute in the specific regions where the email address is located. The appropriate server monitors the mailboxes for the arrival of new emails 124. It also may keep track of email placement into inbox or spam folders as well as the category for the email, such as promotional, update, forum, social media, work, and the like.

If email processor network 130 determines that email 124 should be delivered, then it notifies engagement simulator processor network 120 that messages are ready to be engaged, as disclosed in greater detail below. The appropriate server in processor network 120 may take over the processing and interaction with email 124 at this point. Email processor network 130 may store email 124 along with any metadata about action taken in virtual user email storage 132. The metadata for the decisions by email processor network 130 stored in storage 132 may be used to update profiles on user behavior or what is an appropriate email.

Figure 2A:
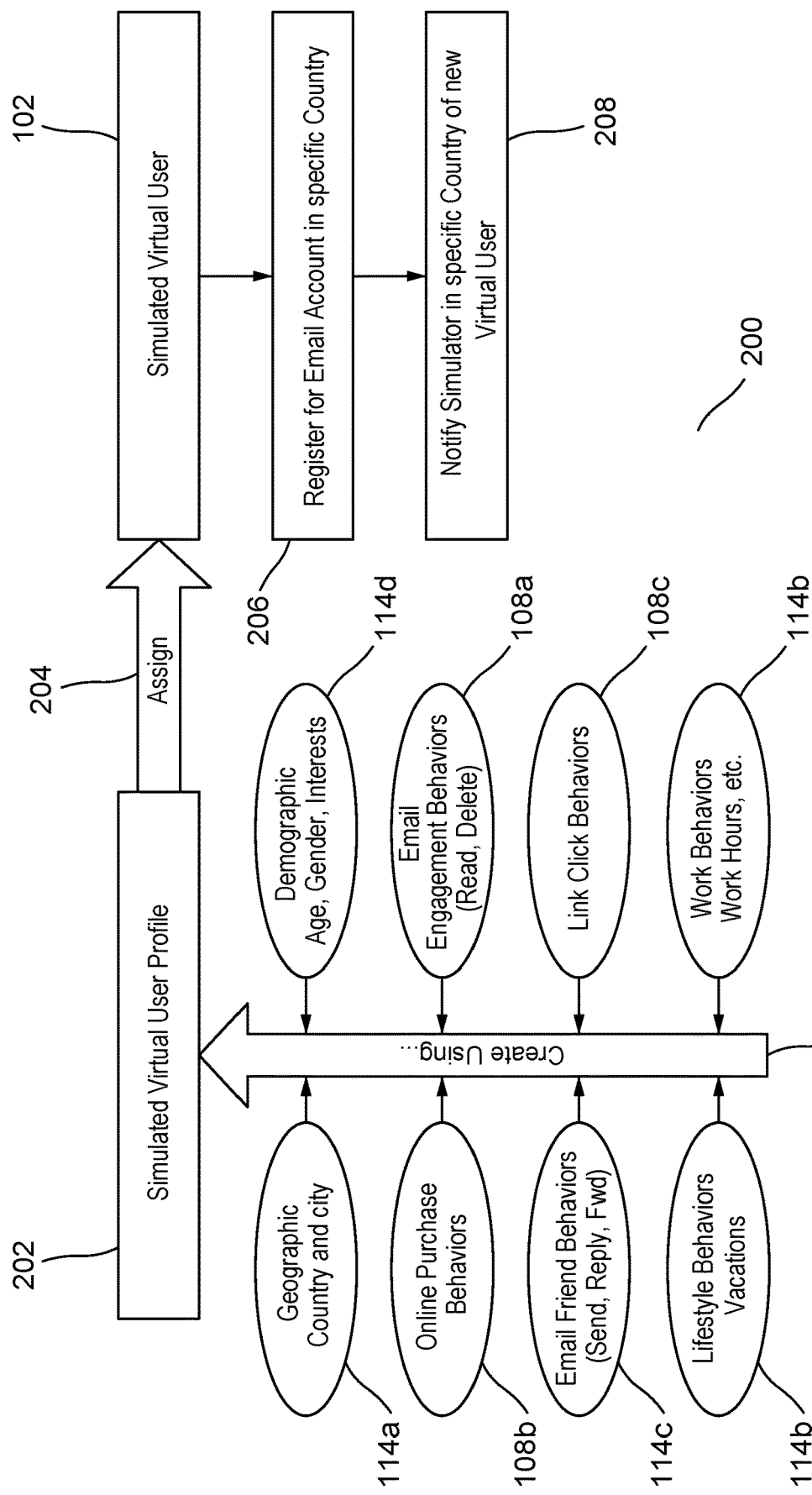
FIG. 2A illustrates a flow diagram for generating and registering an email address to a virtual user according to the disclosed embodiments.

FIG. 2A depicts a flow diagram 200 for generating and registering a simulated virtual user 102 according to the disclosed embodiments. Simulated virtual user 102 is assigned a simulated virtual user profile 202. Thus, step 201 executes by generating simulated virtual user profile 202 using behavior profiles 104 with profiles 108 and demographic and sociographic profiles 114. The different profiles disclosed in FIG. 1A are shown being utilized by step 201. These profiles include geographic information including country and city and demographic information including age, gender, interests, income, and the like. The profiles also include online purchase behaviors, email engagement behaviors, such as read and delete, email friend behaviors, such as send, reply, and forward emails from friends, link click behaviors, lifestyle behaviors, and work behaviors. The data points provided by databases 106 and 112 populate the profiles that are then used to create simulated virtual user profile 202 for simulated virtual user 102.

Figure 2B:
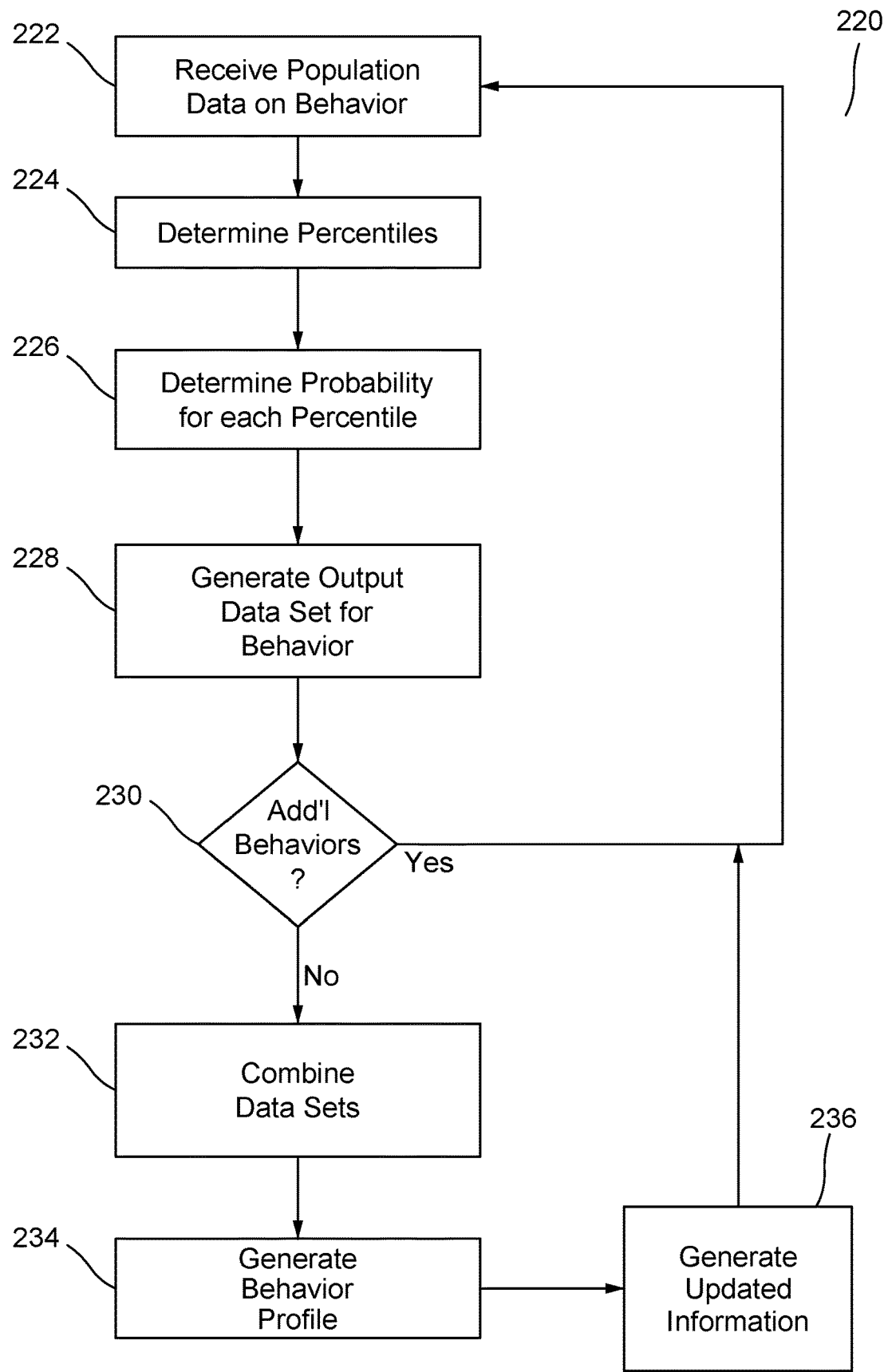
FIG. 2B illustrates a flowchart for generating behavior profiles according to the disclosed embodiments.
Figure 2C:
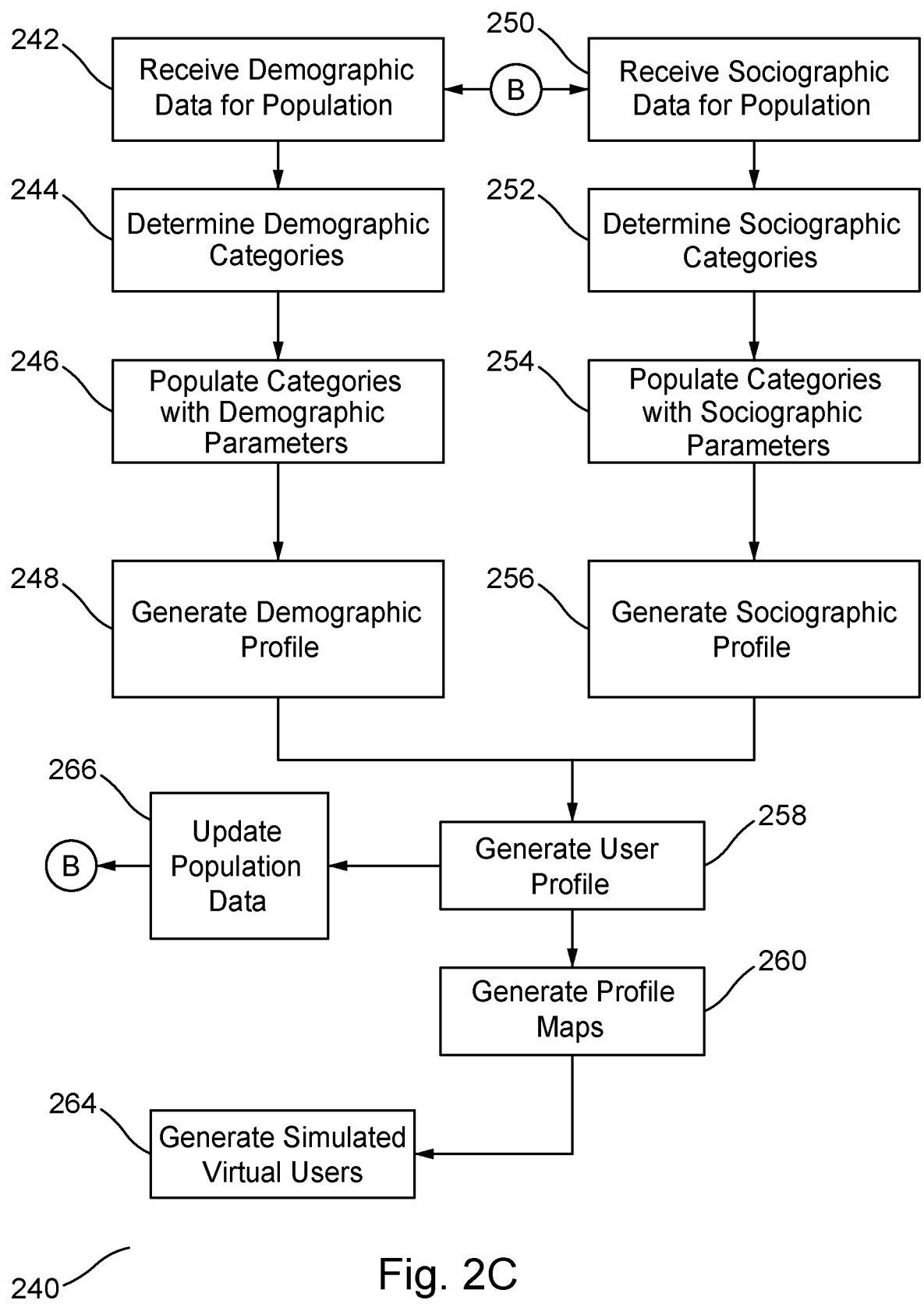
FIG. 2C illustrates a flowchart for generating demographic profiles and sociographic profiles to generate user profiles according to the disclosed embodiments

Step 201 is disclosed in greater detail by flowchart 220 in FIG. 2B and flowchart 240 in FIG. 2C. These flowcharts disclose the generation of behavior profiles, demographic profiles, and sociographic profiles. These profiles may be combined to generate user profiles that are assigned to simulated virtual users. A simulated virtual user profile take from the generated simulated user profiles may include data to influence actions taken by the simulated user that differs from data in other user profiles.

FIG. 2B depicts flowchart 220 for generating behavior profiles 104 according to the disclosed embodiments. Step 222 executes by receiving population data on specific behaviors or actions to be taken with regard to an email account. For a certain defined population, usually based on a location or country, probabilities exist for whether the population will take an action with regard to a received email. For example, the population may read, delete, ignore, or click on a link (interact) with the email. Referring to FIG. 1A, this information may be stored in separate databases 106. For example, database 106*a* may include information about how the population reads an email, database 106*b* may include information about how the population deletes the email, database 106*c* may include information about how the population clicks or interacts with the email, and database 106*d* may include information on the type of the email. Types of emails may be specified according to criteria, such as format, offers, titles, and the like.

Step 224 executes by determining the percentiles for the population. The population may be divided into 100 percentiles. Any number of percentiles may be used. In some embodiments, the amount of the population within each percentile may be equal. Alternatively, the number of users of the population may differ between percentiles. Each percentile includes a percentage of the population such that all of the percentiles add up to 100% of the population.

Step 226 executes by determining the probability a behavior will be enacted or an action taken for each percentile. The disclosed embodiments look at the probability the population of the percentile did the behavior. For example, the population in the first percentile, or 1, has a probability of 10% that they would read an email of a certain type. The population in the third percentile, or 3, has a probability of 20% that they would read the email. Probabilities for the behavior are assigned to each percentile. Further, different types of emails may be broken into percentiles and probabilities.

Step 228 executes by generating an output data set for the percentiles based on the behavior. An example output data set may be shown below:

Output Data Set I for the Read Behavior

| Email Type | Percentile | Probability |
|---|---|---|
| A | 0 | 5% |
| A | 1 | 10% |
| A | 2 | 12% |
| A | 3 | 20% |
| * | | |
| * | | |
| A | 100 | 60% |
| B | 0 | 50% |
| B | 1 | 22% | and so on.

Step 230 executes by determining whether additional behaviors should be analyzed and an output data set for the behavior created. If yes, then flowchart 220 returns to step 222 to model the behavior within the percentiles. Step 224 may be skipped in that the percentiles are already created so the disclosed embodiments may assign the probabilities to the behavior. For example, if output data set I corresponds to the read behavior, then the next output data set II may correspond to the delete behavior.

If step 230 is no, then step 232 executes by combining the output data sets. Referring back to FIG. 1A, the output data sets may relate to profiles 108. Each profile may reflect the types of emails and how the percentiles engage with them. Step 234 executes by generating the corresponding behavior profile 104 using the combined data sets. Each percentile within the behavior profile will be assigned the probabilities within the output data sets for that percentile. In some embodiments, the type of email may have its own behavior profile. An example behavior profile 104 may be shown below Behavior Profile Output Data Set

| Percentile | Read | Delete | Click | Ignore |
|---|---|---|---|---|
| 1 | 90% | 5% | 5% | 0% |
| 2 | 80% | 4% | 3% | 13% |
| 3 | 20% | 15% | 10% | 55% |
| 4 | 5% | 50% | 20% | 25% |
| 5 | 55% | 40% | 0% | 5% |
| * | | | | |
| * | | | | |
| 100 | 1% | 80% | 9% | 10% |

Step 236 executes by generating updated information for the population after a specified period. For example, data for the email behavior may be updated daily. This information is provided to databases 106. The percentiles should be updated accordingly with the new information. Flowchart 220 then returns to step 222 to update the output data and behavior profile 104 accordingly.

The behavior profile or profiles may be used to populate profiles 108a, 108b, and 108c shown in FIG. 2A. The generation of the data to populate profiles 114a, 114b, 114c, and 114 is disclosed by flowchart 240 in FIG. 2C. Profiles 114a and 114d may be the demographic profiles while profiles 114b and 114c may be the sociographic profiles. Steps 242-248 relate to generating a demographic profile while steps 250-256 related to generating a sociographic profile.

Step 242 executes by receiving the demographic data for the population under consideration. This data may be stored in databases 112a and 112d. As noted above, the behavior activity may be considered for a population limited to a location or country. This feature may be important to accurately predict email response behavior by the virtual users. It would not be advisable to have a virtual user for one state to adopt the behavior of a virtual user in another state or country.

Step 244 executes by determining the various demographic categories to be used for the virtual users. Such categories may include age, income, gender, education level, residence, interests, and the like. Step 246 executes by populating these categories with the appropriate demographic parameters. For example, using the percentiles, averages for each parameter may be calculated. For the demographic profile of the percentile, a parameter is randomly assigned based on the breakdown of the averages. If the percentile of the population, as disclosed above, is 60% female and 40% male, then the demographic parameter for gender may randomly assigned with a 60% weight provided for being a female. A random number may be assigned with female being assigned as the gender for a number between 1-60 and male for a number between 61-100. Other assignment techniques may be implemented.

Step 248 executes by generating a demographic profile for the percentiles. Referring to FIG. 2A, profiles 114a and 114d may be generated. This process may be repeated as needed for different demographics. Further, like behavior profiles 104, profiles 114a and 114d may be updated periodically to reflect changes in the population.

The profile may list the demographic parameters in the profile with sections much like the percentiles. An example demographic profiles may be:

| Percentile | Location | Age | Income |
|---|---|---|---|
| 1 | Denver | 21-30 | $30,000-39,999 |
| 2 | Colorado Springs | 41-50 | $70,000-79,999 |
| 3 | Denver | 80+ | $60,000-69,999 | and so on.

Step 250 executes by receiving the sociographic data for the population. This data may be stored in databases 112b and 112c. Step 252 executes by determining the sociographic categories for the simulated users. Examples of categories may be vacation habits, such as when and how long, working hours including when one arrives and leaves work, sleeping patterns, eating patterns, use of social media, and the like. As noted above, the disclosed embodiments want to use the sociographic data and parameters for the given population to determine possible behavior activity. For example, if an email is received when the virtual user is probably asleep, then no activity on the email account may occur for several hours.

Step 254 executes by populating the sociographic categories with the appropriate parameters. Again, a percentile may be examined to determine the prevalent sociographic parameters for the population of the percentile. The most prevalent ones may be used to populate the categories and they may be randomly assigned. Step 256 executes by generating the sociographic profile. Much like the demographic profiles, a sociographic profile may be broken into percentiles with ranges or other designations for the parameters noted therein. Referring to FIG. 2A, profiles 114b and 114c may be generated.

Step 258 executes by generating user profiles 202 by combining the behavior, demographic, and sociographic profiles as shown in FIG. 2A by step 201. To make the profiles work together, step 260 executes by creating profile maps using the profiles. As disclosed above, each profile may include an entry having a percentile or number designator that then includes various probability or parameter information. The entries do not correspond to each other. For example, a percentile of 3 does not correspond to an entry of 3 in a demographic profile. Preferably, each profile may have 100 entries to reflect many different aspects of the population and data within the databases.

Returning back to FIG. 2A, step 204 executes by assigning mapped entries from user profile 202 to simulated virtual user 102. This step also may be shown as step 264 in flowchart 240. Virtual user 102 will then reflect the data points in the profiles to dictate how the virtual user will act when using the virtual email account. A mapped entry from each profile is used to create the simulated virtual users. The mapped entries create the persona for the virtual users. An example of the mapped entries for the simulated virtual users may be:

| Simulated User | Behavior | Demographic | Sociographic |
|---|---|---|---|
| 1 | 2 | 3 | 2 |
| 2 | 1 | 2 | 5 |
| 3 | 23 | 41 | 51 |

Such a table of mapped entries may be provided for any number of simulated virtual users. Alternatively, the mapped entries may reflect each profile 108 and 114 so that as many as 8 mapped entries. This feature allows many different types of simulated virtual users to be created having various behavior, demographic, and sociographic characteristics.

Step 266 of flowchart 240 executes by updating the population data within the databases for updating the demographic and sociographic profiles. Such updates do not need to be done daily, but should be performed periodically to reflect changes along with the changes in behaviors in the behavior profiles. Flowchart 240 then may return to steps 242 and 250.

Referring back to FIG. 2A, step 206 executes by registering simulated virtual user 102 for an email account in a specific country. Thus, each simulated virtual user 102 will have an email. This email account is a real email account created for the purposes of receiving and interacting with real email. The email account is not treated as a dummy account to just receive email. Referring to the mapped entries disclosed above, each user will have an email assigned to it. Preferably, step 206 uses simulated virtual user engagement simulator processor network 120 to select the appropriate processor within the network to use. Multiple processors may be used to monitor and analyze email activity. The processors may correspond to different locations or areas. In some instances, the selected processor may correspond to the location or area that provided the population information for the simulated virtual user email account. Step 208 executes by notifying simulator 126 in the specific country of the new virtual user and the new virtual email account.

Figure 3A:
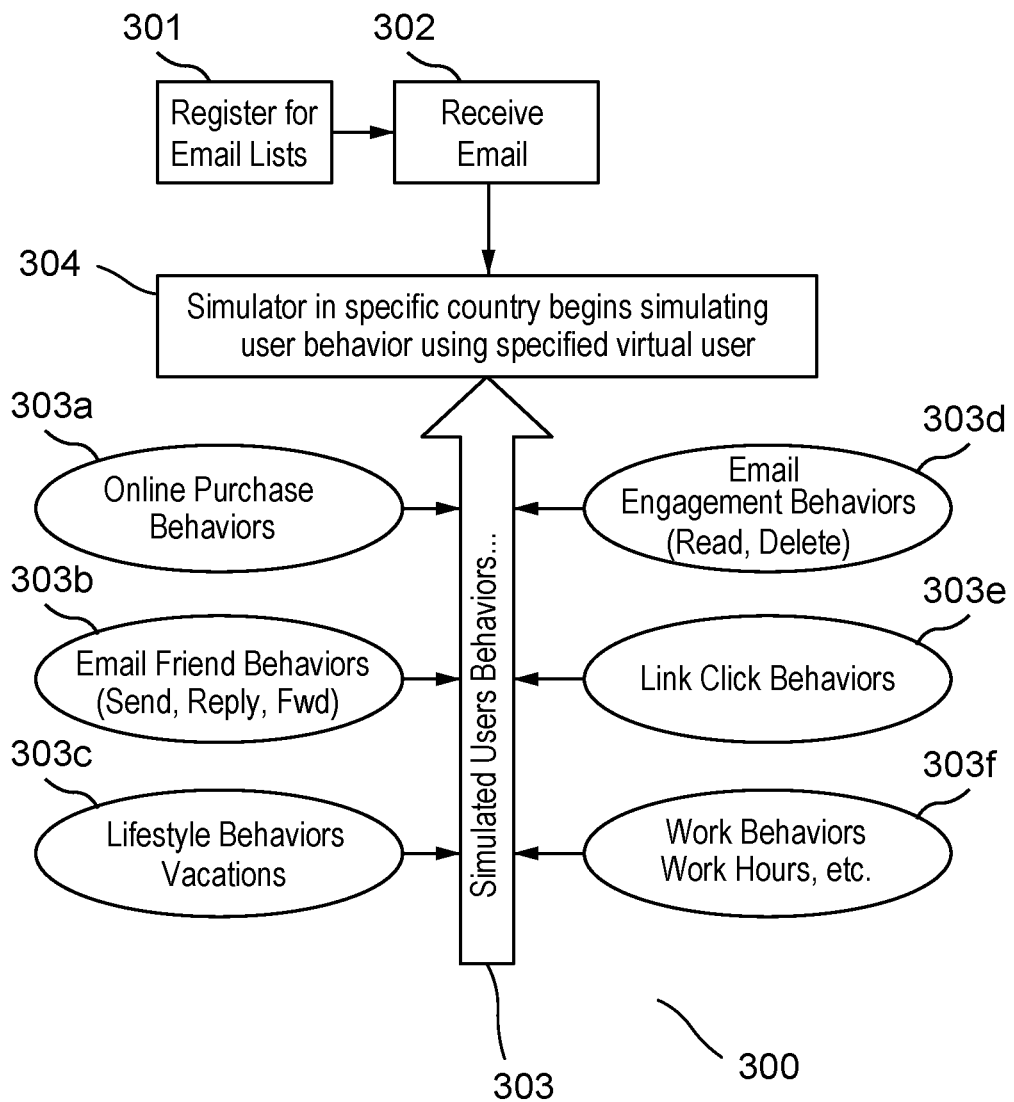
FIG. 3A illustrates a flow diagram for simulating user behavior using a virtual email account according to the disclosed embodiments.

FIG. 3A depicts a flow diagram 300 for simulating user behavior using a virtual user having an email account according to the disclosed embodiments. Step 301 executes by registering the email address for the simulated virtual users, such as virtual user 102, with emails lists or campaigns for brands or companies 122. Referring back to FIG. 1B, a proxy server in processor network 118 searches and identifies email lists for the emails to register as though the user is from a location or country associated with the proxy server. Processor network 118 may include servers that act as webcrawlers to find the email lists for email accounts in their country or location. The email lists may be identified by interests or other factors set forth in the user profile of the virtual user. This process is disclosed in greater detail by FIG. 3B.

Figure 3B:
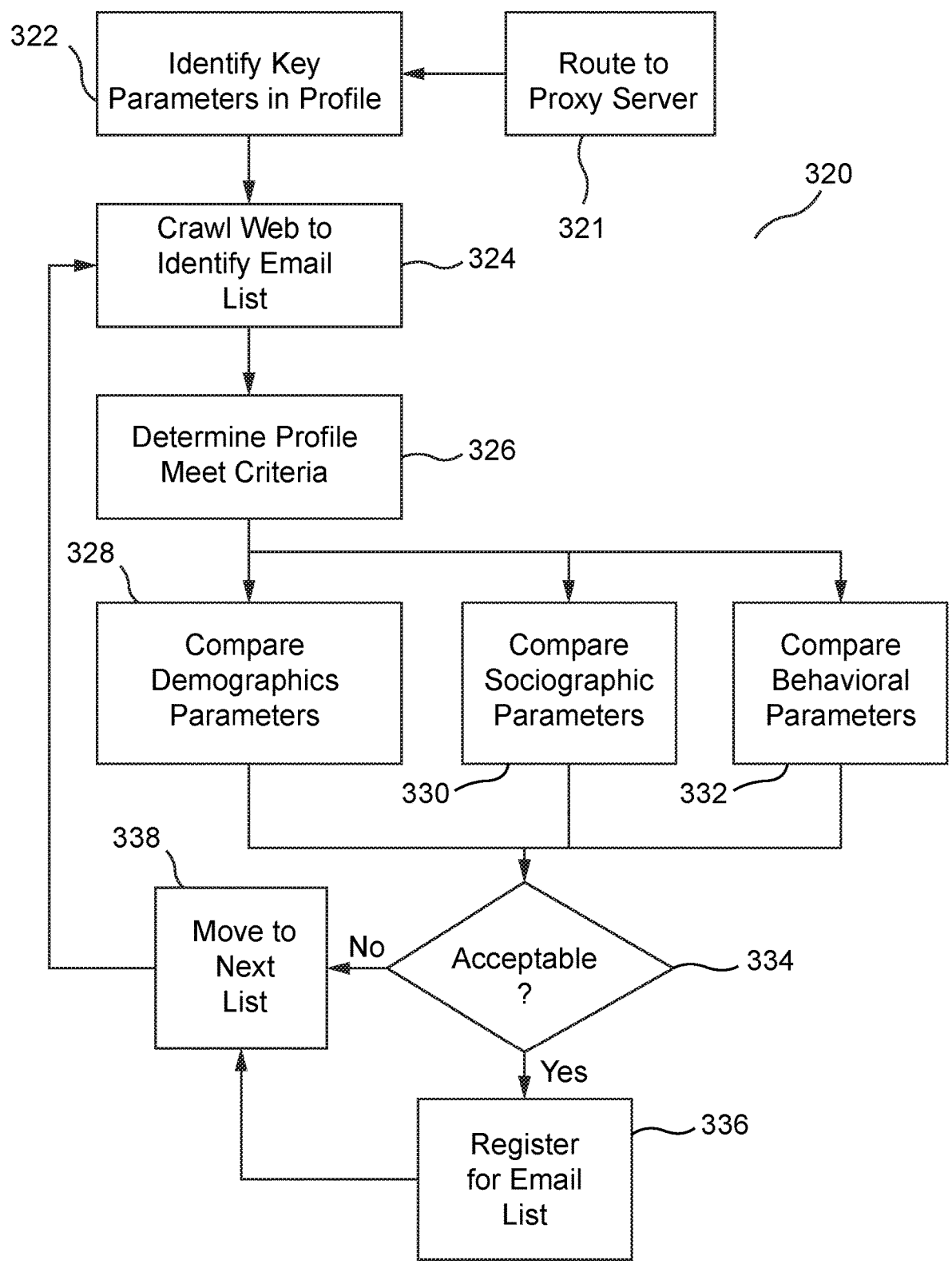
FIG. 3B illustrates a flowchart for identifying and registering an email account for a virtual user with one or more email lists according to the disclosed embodiments.

FIG. 3B depicts a flowchart 320 for identifying and registering an email account for a virtual user with one or more email lists according to the disclosed embodiments. In some instances, a proxy server in processor network 118, such as proxy server 118a, may just register the email addresses and associated virtual user accounts with every email list and service specified to the network. Processor network 118 also may register emails in a distributed manner such that each email address is used for a certain number of lists and campaigns. Alternatively, proxy server 118a may do some additional processing to identify the appropriate email lists and service for which to register, as disclosed by flowchart 320.

Step 321 executes by routing the email address and associated information to the appropriate proxy server in processor network 118. Preferably, the data that determines where to route the email address is location. The email address and account may be "located" in a specific country, state, or locale. The appropriate proxy server is or acts like it is in that location. This feature is important because the type of email that one may receive usually differs on the location of the user, especially when taking into account cultural or other differences between populations in different locations. For example, proxy server 118a should register a virtual user located in France for email lists, brands, and companies of interest with the French population. In contrast, proxy server 118a probably does not want to sign up an email address from France with American baseball team mailing lists.

Once at the appropriate proxy server, step 322 executes by identifying key parameters in the user profile for virtual user 102 of the email account. Such parameters may be demographic such as age, gender, education level, and the like. Step 322 also may identify interests, if any, set forth in the user profile. For example, the user profile may include data on a favorite sports team. This parameter may be identified by proxy server 118a.

Step 324 executes by crawling the web, or internet, to identify webpages for companies, brands, and the like that include email lists for which to register. In doing so, proxy server 118a may use the parameters identified above. For example, based on the age of the virtual user, webpages for certain groups may be identified and the email address registered in the appropriate site. Step 326 executes by determining whether the identified webpage meets criteria to be considered for registration. The criteria may be set forth by proxy server 118a based on location and the like. For example, certain government agency subscription lists may not allow users from certain countries to register for emails.

Step 328 executes by comparing the information on the webpage or about the potential list to demographic parameters. Step 330 executes by comparing the information on the webpage or about the potential list to sociographic parameters. Step 332 executes by comparing the information on the webpage or about the potential list to behavioral parameters. As disclosed above, some embodiments want to match the lists to subscribe the virtual user to the parameters so that the registered virtual user resembles an actual user. In some embodiments, a minimum match criteria may be set for the webpage. For example, the webpage may need to have information that matches 50% of the parameters set forth by the profiles, or possibly just the demographic profile.

Step 334 executes by determining if registering for emails at the webpage is acceptable based on the analysis done above. If yes, then step 336 executes by using proxy server 118a to register the email account to the email list. The email address is entered into the list or service using one from the country of proxy server 118a. If no, then step 338 executes by moving to the next email list or webpage. Proxy server 118a may crawl to the next email list as flowchart 320 returns to step 324.

Step 302 executes by receiving an email 124 from one of the brands or companies 122 at which the email address is registered. Email 124 may be received at email processor network 130 at one of its servers for the location of the email address. Email processor network 130 determines whether to place email 124 into the inbox for the email address or into a spam folder. This process is disclosed in greater detail in FIG. 3C.

Figure 3C:
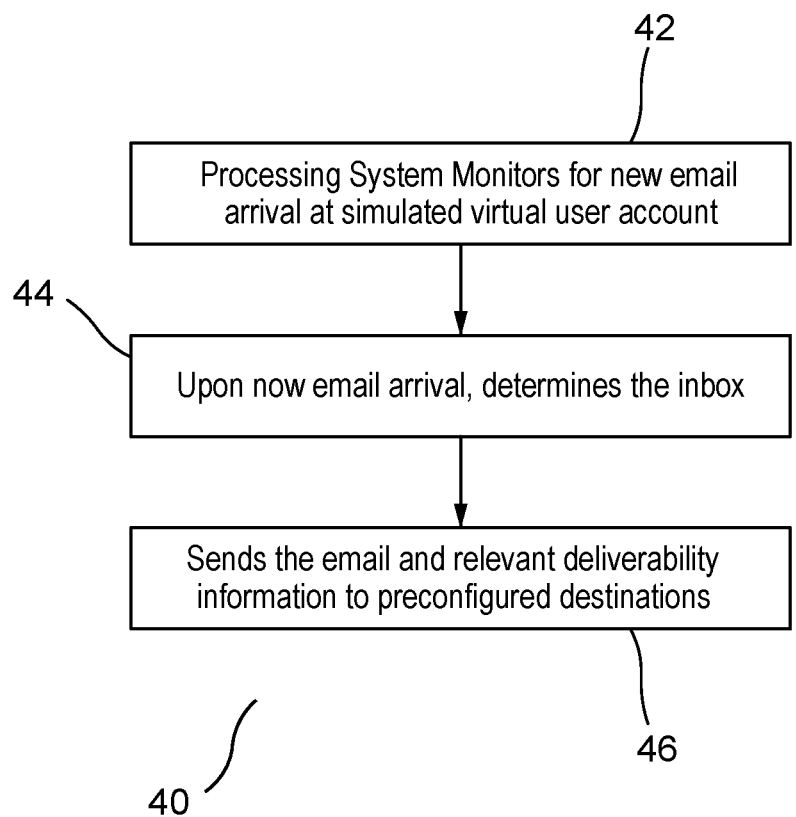
FIG. 3C illustrates a flow diagram for receiving an email at the email account according to the disclosed embodiments.

FIG. 3C depicts a flow diagram 40 for receiving an email 124 at the email account according to the disclosed embodiments. Step 42 executes by monitoring for new email arrival at the simulated virtual user account by simulated virtual user email processor network 130. The email account is registered for various lists, forums, and other services. Step 44 executes by determining the inbox placement for new email 124. Email processor network 130 determines whether to deliver the email to the appropriate inbox or place it in a spam folder. Step 46 executes by sending the email and relevant deliverability information to preconfigured destinations.

Step 303 executes by simulating user behaviors based on the profile information provided by simulated virtual user profile 202. As an email 124 is received at the virtual email account, step 303 may retrieve information based on the profile data. Information for the behaviors may be gathered by the appropriate server in engagement simulator processor network 120. The behaviors are based on the user profile and may include online purchase behaviors 303a, email friend behaviors (send, reply, forward, and the like) 303b, lifestyle behaviors (interests, vacations, fitness, and the like) 303c, email engagement behaviors (read, delete, and the like) 303d, link click behaviors 303e, and work (hours, breaks, accessibility, and the like) behaviors 303f. As disclosed above, the user profile for the virtual user will have a panel to identify the appropriate behavior to take for each potential action.

Step 304 executes by simulating user behavior for simulated virtual user 102 using specified virtual user profile by simulator 126. This process is disclosed in greater detail in FIG. 3D, which depicts a flowchart 350 for simulating virtual user behavior for an email received at an email account according to the disclosed embodiments. Flowchart 3D may refer to the components disclosed by FIG. 4. FIG. 4 shows a block diagram of simulator 126 interacting with email account 402 to process email 124 according to the disclosed embodiments.

FIG. 4 shows email 124 being delivered to email account 402. Preferably, email 124 has been determined by email processor network 130 to be delivered to a server within engagement simulator processor network 120. In this example, server 120b may be used as the email address for email account 402 is in the United Kingdom. Email 124 may include metadata 124a within it. Metadata 124a may be the text, keywords, sender, domain, and the like data associated with email 124.

Figure 3D:
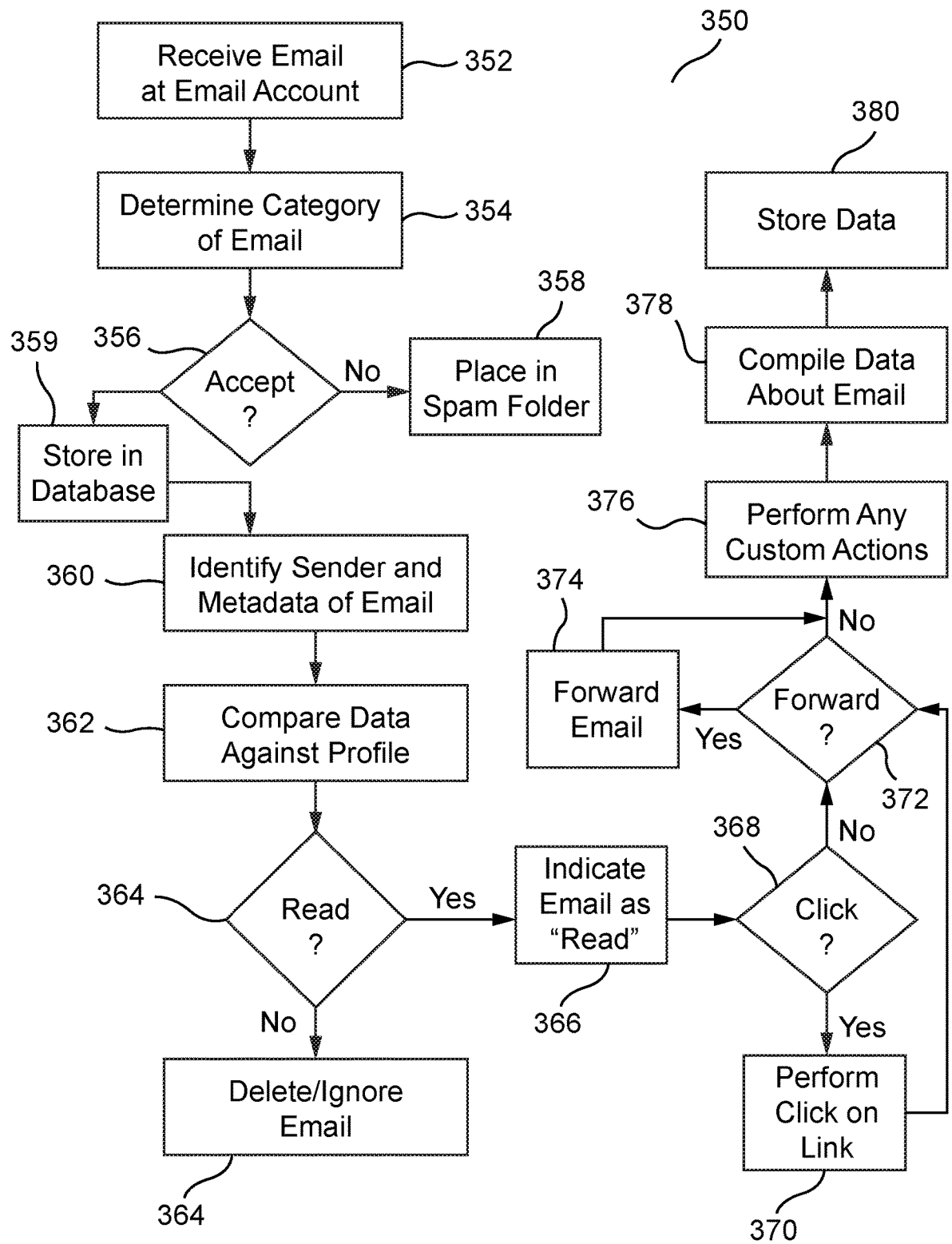
FIG. 3D illustrates a flowchart for simulating virtual user behavior for an email received at an email account according to the disclosed embodiments.
Figure 4:
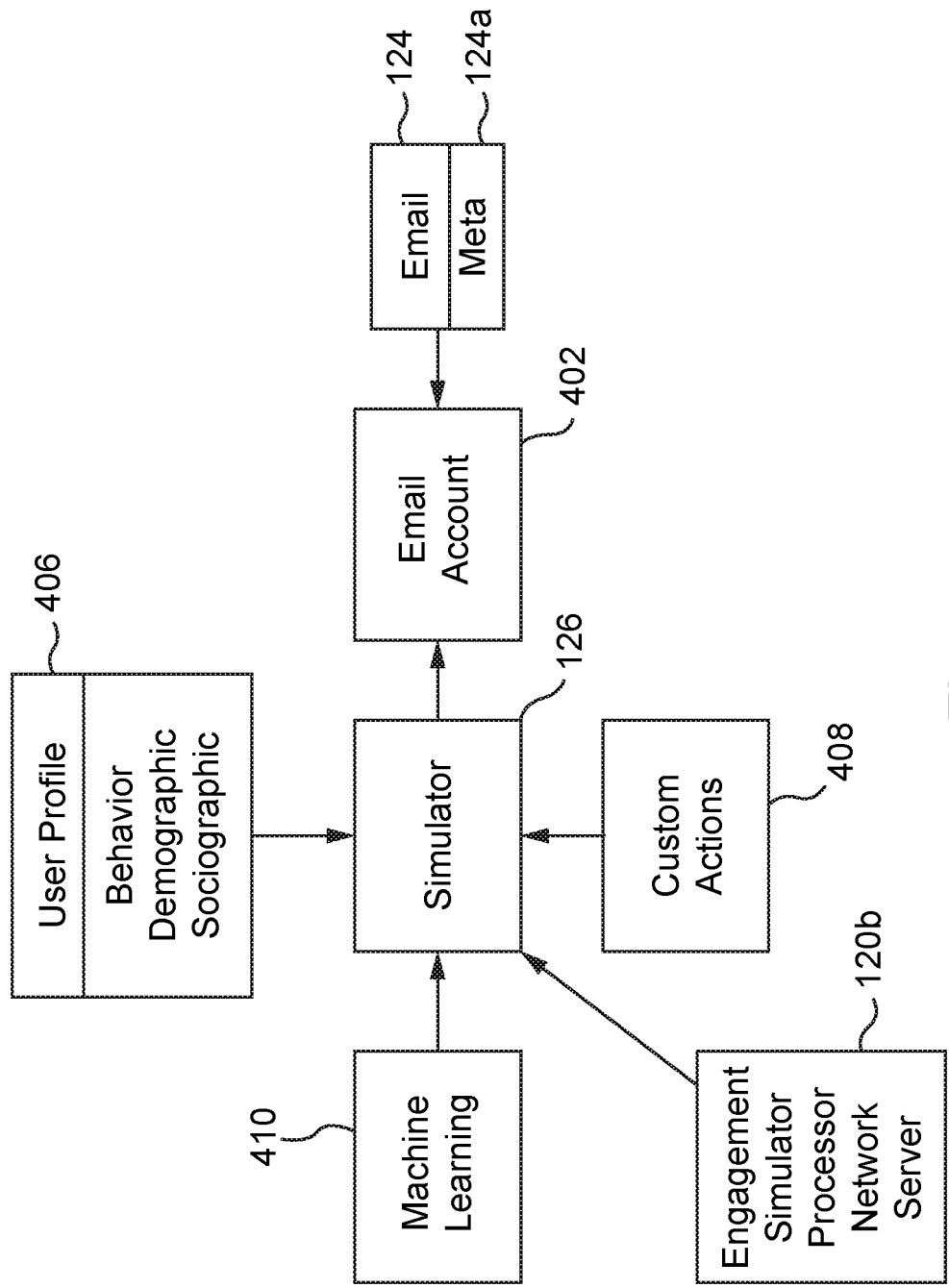
FIG. 4 illustrates a block diagram of a simulator interacting with an email according to the disclosed embodiments.

As disclosed in FIG. 3D, simulator 126 will retrieve and use information for different sources in determining how to interact with email 124. For example, user profile 406, as disclosed above, includes behavior, demographic, and sociographic information provided by the appropriate profiles. The profiles may be stored on server 120b and loaded into simulator 126 when needed. This feature allows user profile 406 to be updated continuously as the virtual user changes behaviors. Using the above Black Friday example, a user's probability to read an email from a business selling products associated with the virtual user may increase the closer it gets to Black Friday. The updated profiles reflect this.

Simulator 126 also may take into account custom actions 408. Custom actions 408 may refer to a predetermined set of actions to be taken on certain category of emails. Custom actions 408 may include a script or macros to perform the actions in a certain order. In some embodiments, custom actions 408 are executed by a bot with simulator 126. Custom actions 408 differ from the behaviors outlined in user profile 406 or shown in FIG. 3A as the custom actions are not based on past history. They are actions that may be performed programmatically.

An example of custom actions 408 may be instructions on how to fill out a survey received within email 124. Simulator 126 clicks the links or selections for the survey according to the script provided. The instructions may be customized or selected randomly. Another example may using Dropbox™ to periodically share and read documents from others. Email 124 may include a link to the Dropbox account and simulator 126 clicks on the link to read the documents. These actions better simulate an actual user having email account 402.

Referring back to FIG. 3D, a process to receive and process email 124 is disclosed. Some of the steps in flowchart 350 may resemble steps in flow diagram 40. These steps are included here for illustrative purposes. The disclosed embodiments may implement any of the steps herein.

Step 352 executes by receiving email 124, as shown in step 302. Email 124 may be received by email processor network 130. Emails may be received at the appropriate country or location server within email processor network 130 on a periodic basis, such as every 15 minutes. Step 354 executes by determining the category of email 124. For example, email 124 may be a promotion, a forum update, spam, a survey, a personal email from one of a friend's list, email from someone new, and the like. Some email systems do not have categories. In this instance, machine learning may be used to identify the category for the email. In other words, email processor network 130 has "learned" what categories in which certain emails belong using information within the email. Metadata 124a may be used to identify a category for email 124.

Step 356 executes by determining whether the email is acceptable. For example, for certain users, emails including surveys may not be accepted. The population historically has not entered the surveys of emails. If no, then step 358 executes by placing email 124 into a spam folder and not delivering it to email account 402. This action may be stored in virtual user email storage 132.

If step 356 is yes, then email 124 and its associated metadata 124a is stored in email storage 132. Email processor network 130 then forward email 124 to email account 402 and informs engagement simulator processor network server 120b that it has work to do. Server 120b then enables simulator 126 to access email account 404.

Step 360 executes by identifying the sender of email 124 and metadata 124a. Simulator 126 may want to check if the sender matches any email lists for the email address of account 402. The sender of email 124 may have a significant influence on how simulator 126 treats email 124. Metadata 124a also is determined. Metadata 124a may include the category of the email, when it was sent, whether it includes an update, which format the email may be in, and the like.

Step 362 executes by comparing the data and metadata in email 124 to user profile 406. As disclosed above, user profile 406 provides a map to determine how virtual user 102 will act with regard to the email using simulator 126. Simulator 126 compares the information within the email to the possible behaviors to be taken. For example, if email 124 includes a link, simulator 126 looks at the behaviors in user profile 406 to determine if virtual user 102 would click on it. The subsequent steps may compare the data and metadata against the information in user profile 406 to determine whether an action is to be taken.

Step 364 executes by determining whether to read email 124 by simulator 126. If no, then step 364 executes by deleting or ignoring email 124 from email account 402. Some users never delete an email, so one behavior may be just ignoring it and deleting it according to the settings for email account 402, such as after 90 days. If step 364 is yes, then step 366 executes by indicating that email 124 has been read.

Step 368 executes by determining whether to click a link or other feature if within email 124. If yes, then step 370 executes by simulator 126 performing a click on the link. At this time, simulator 126 may perform custom actions 408, if applicable. If step 368 is no, then step 372 executes by determining whether to forward email 126 to another virtual user. Such actions mimic actual users and may be noted by the sender that email account 402 is a "live" account. Further, the other virtual email account may be monitored as to how it treats the forwarded email. If yes, then step 374 executes by forwarding email 124 to another email account for another virtual user. The account may be selected randomly or according to some criteria, such as a "friend" on social media that both email addresses are registered.

If step 372 is no, then step 376 executes by performing any custom actions 408, if applicable. As disclosed above, server 120b may have specific instructions on how to handle certain emails arrived at email account 402. Simulator 126 performs these actions. Step 378 executes by compiling data from simulator 126 and server 120b about the interaction with email 124 to use in updates and for review. Step 380 executes by storing this data, for example, in database 116.

An example of how system 100 may be used is provided below. A company is interested in whether email users read and interact with their marketing campaigns. Access to actual email data for the email campaigns is unavailable. Thus, simulated virtual users are generated using the profile data drawn from the different databases. These simulated virtual users appear and act like real-work users. The virtual users then register for actual email accounts on email service platforms. The virtual email accounts begin receiving email campaigns from the company. A simulator uses the virtual users and their profiles to interact with the emails in the accounts. This activity is monitored and analyzed to provide deliverability and other data back to the company.

Figure 5:
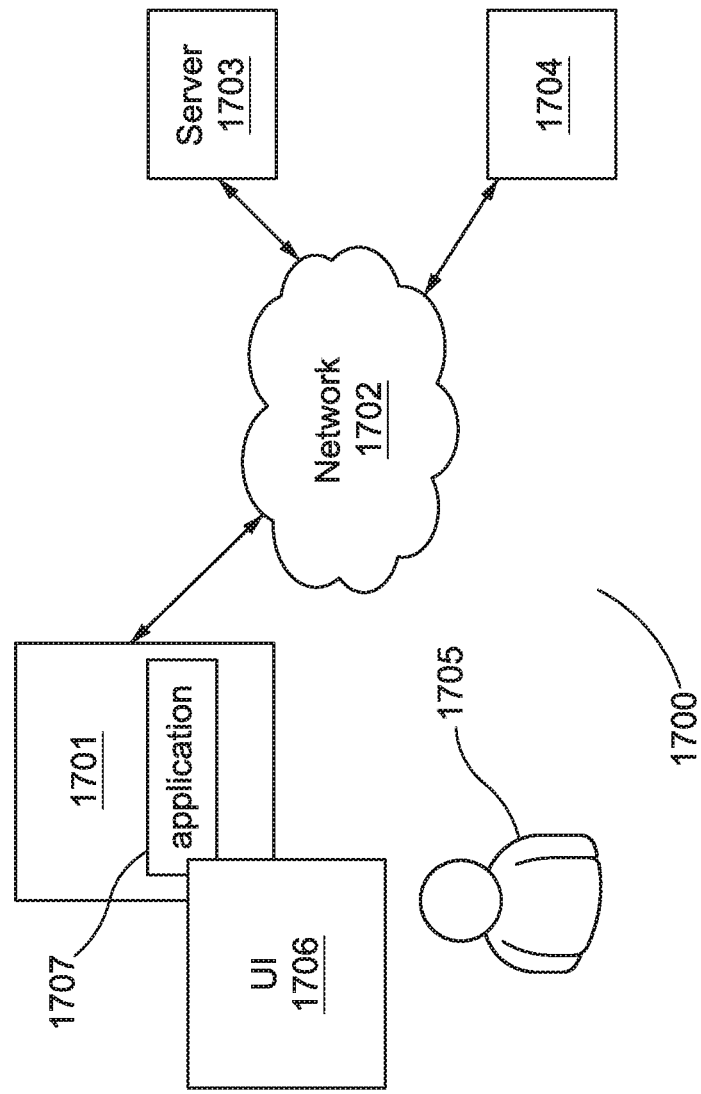
FIG. 5 illustrates a block diagram of a system for sending and delivering an email according to the disclosed embodiments.

FIG. 5 depicts a block diagram of a system 1700 for sending and delivering an email according to the disclosed embodiments. System 1700 includes a computing device 1701 operably connected to a network 1702 to communicate with one or more servers, such as server 1703. Computing device 1701 also communicates with other computing devices, such as computing device 1704 using system 1700 and network 1702. Additional computing devices may be included in system 1700. In other words, computing device 1701 may be connected to any number of computing devices to exchange information.

Network 1702 may be a cellular network, such as those for a wireless device, a point-to-point dial up connection, a satellite network, the internet, a local area network (LAN), a wide area network (WAN), a wireless (WiFi) network, an ad hoc network, and the like. Such networks may be used to connect various types of network elements, such as hubs, bridges, routers, switches, servers, and gateways. Network 1702 may include one or more connected networks, such as a multi-network environment, including public networks, such as the internet, or private networks, such as a secure enterprise private network. Access to network 1702 may be provided via one or more wired or wireless access networks.

Computing device 1701 may be a personal computer, such as a desktop or laptop computer, a mobile device, a smart device, a tablet, and the like. Computing 1701 may be seen in greater detail below with respect to computing system 1800.

Server 1703 may be an enterprise server, cloud-based server, dedicated server, host server, and the like. Certain aspects of computing system 1800 may be representative of server 1703. Other computing devices, such as computing device 1704, may be a personal computer, a personal digital assistant (PDA), a mobile device, a smart device, a tablet, and the like. Computing device 1704 is used to access a server, such as server 1703, and communicate with computing device 1701 and other computing devices over network 1702.

Computing devices 1701 and 1704 may be any type of computer system that provides its user the ability to load and execute software programs and the ability to access network 1702 to communicate with one or more servers 1703. It should be noted that communications between devices may occur over multiple networks, for example, cellular and wireless networks.

Computing device 1701 is configured to receive input from a user 1705, using a user interface 1706. User interface 1706 may be keyboard, touch screen, voice activated device, mouse, and the like that is operably coupled to computing device 1701. Computing device 1701 also may include a display, such as a computer monitor, that is configured to display one or more user interfaces 1706. In some embodiments, the display may be a touchscreen. At least some of user interfaces 1706 include fields for initiating or continuing communications with one or more entities, generally referred to as potential recipients or contacts. For example, an email application is stored on computing device 1701 as a client-side application.

In another embodiment, user 1705 may access a web-based email application, instant messaging application, and the like using a standard internet browser, or application, 1707. The interface of application 1707 may be displayed to user 1705 within the internet browser. Thus, application 1707 is used to compose an email or other document or initiate a communication and may be a client-side application or a non-client side, or web-based, application.

When application 1707 is launched, user interface 1706 for the email application may be presented to user 1705. User 1705 may prepare a message via user interface 1706 that is to be sent to one or more recipients. Similarly, the recipients may view a received message via a user interface on computing device 1704. With the particular arrangement of user interface 1706 and input field options may vary across different applications and products, the disclosed embodiments are applicable to any user interface wherein a message may be composed.

Figure 6:
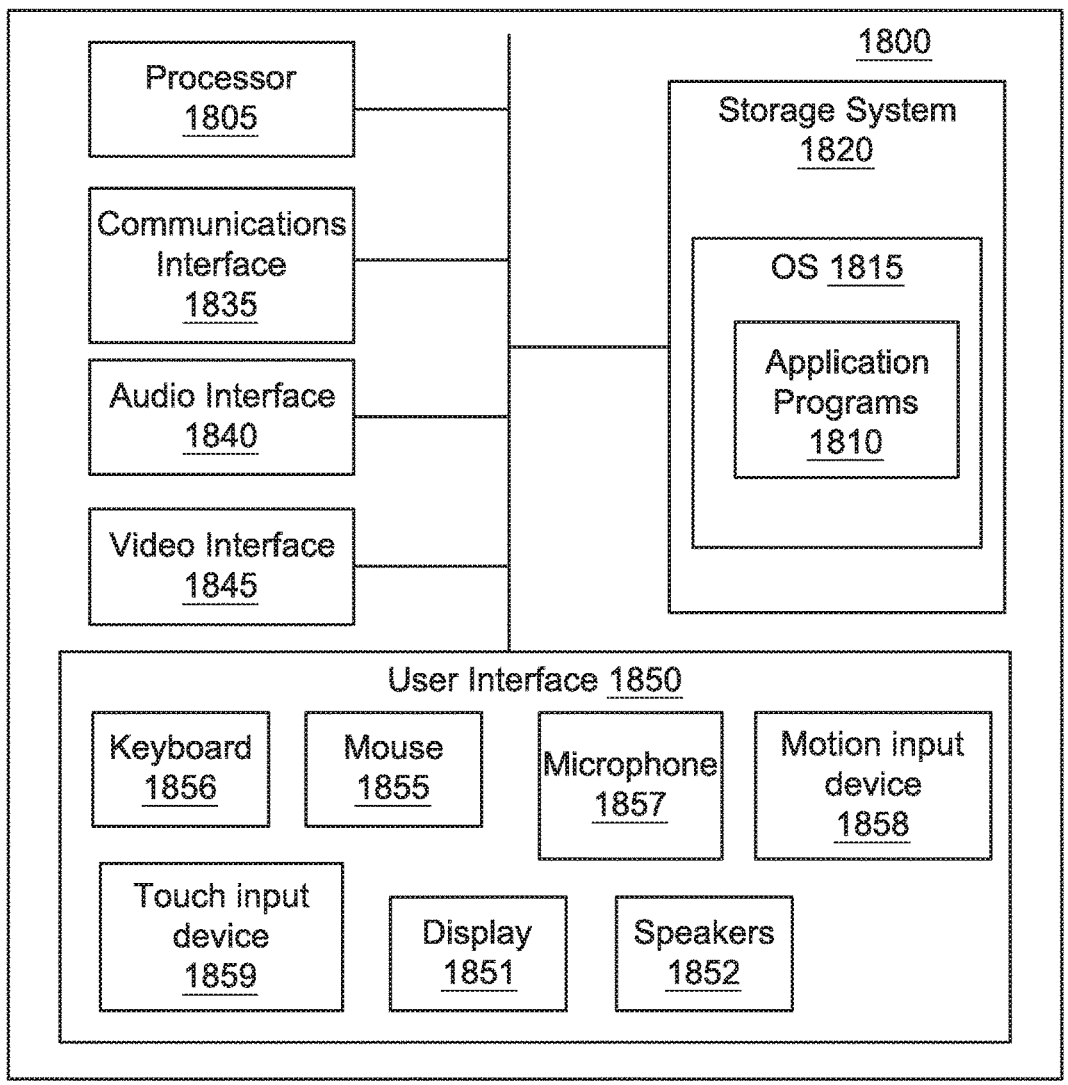
FIG. 6 illustrates a block diagram of the components of a computing device according to the disclosed embodiments.

FIG. 6 depicts a block diagram of the components of the computing device 1800 according to the disclosed embodiments. Computing device, or system, 1800 may be implemented within a single computing device or distributed across multiple computing devices or sub-systems that cooperate in executing program instructions. Device 1800 may be used to implement a myriad of computing devices, such as a personal computer, a personal digital assistant (PDA), a mobile device, a smart device, a tablet, and the like. Device 1800 may correspond to computing device 1701 or 1704 disclosed above.

Device 1800, for example, includes processor 1805 that processes data according to the instructions of one or more application programs 1810. Application programs 1810 interact with device operating system (OS) 1815. Examples of processors 1805 include general purpose central processing units, application specific processors, and logic devices, as well as any other type of processing device, combinations, or variations thereof.

Application programs 1810, OS 1815, and other software may be loaded into and stored in storage system 1820. Device OS 1815 may control and coordinate the functions of the components of device 1800. This feature provides an easier manner for applications to connected with lower level interfaces like the network interface. It should be noted OS 1815 may be implemented both natively on computing device 1800 and on software visualization layers running atop the native device. Virtualized OS layers may be used to provide additional, nested groupings within OS 1815 space, each containing an OS, application programs, and application product interfaces (APIs).

Storage system 1820 may include any computer readable storage media readable by processor 1805 and capable of storing software and program instructions, such as application programs 1810 and OS 1815. Storage system 1820 may include volatile and non-volatile, removable and non-removable media implemented for storage of information, such as computer readable instructions, data structures, program modules, or other data. Examples of storage media include random access memory (RAM), read only memory (ROM), magnetic disks, optical disks, flash memory, virtual memory and non-virtual memory, magnetic cassettes, magnetic tape, magnetic disk storage, or other magnetic storage devices, or any other suitable storage media. In addition to storage media, storage system 1820 may include communication media over which software may be communicated internally or externally. Storage system 1820 may be implemented as a single storage device by also may be implemented across multiple storage devices or sub-systems co-located or distributed relative to each other. Storage system 1820 may include additional elements, such as a controller, capable of communicating with processor 1805.

Software may be implemented in program instructions to be executed by device 1800 in general or processor 1805 in particular. These program instructions may direct device 1800 or processor 1805 to operate in a specified manner. The program instructions turn a computer into a special purpose machine in order to perform specified functions according to the disclosed embodiments. When loaded into processor 1805 and executed, the software or program instructions transform device 1800 from a general-purpose computing device into a special-purpose computing device customized to generate a representative electronic document for a plurality of electronic documents, such as emails, having private information.

The components of device 1800 may be included in a system-on-a-chip device. These components may include processor 1805, communications interface 1835, and at least some of the memory associated with storage system 1820. Other components of device 1800 include audio interface 1840 and video interface 1845. Audio interface 1840 may be a microphone, while video interface 1845 includes a camera along with associated programs to capture video or picture data for storage on device 1800. These interfaces create data files that may be retrieved later by application programs 1810.

Communications interface 1835 may include communications connections and devices that allow for communication with other computing systems over one or more communication networks. Examples of connections and devices that together allow for inter-system communication may include network interface cards, antennas, power amplifiers, RF circuitry, transceivers, and other communication circuitry. The connections and devices may communicate over communication media, such as metal, glass, air, or any other suitable communication media, to exchange communications with other computing systems or networks of systems. Transmissions to and from communications interface 1835 are controlled by OS 1815. OS 1815 may inform applications and APIs of communication events when necessary.

Figure 7:
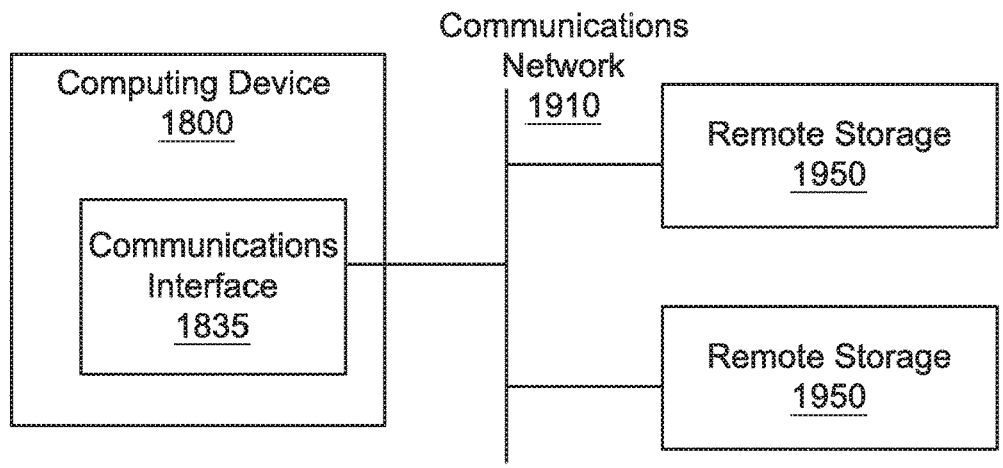
FIG. 7 illustrates an architecture having several network devices according to the disclosed embodiments.

According to some embodiments, data or programming instructions utilized by device 1800 may be stored thereon. As shown in FIG. 7, data or programming instructions may be stored on any number of remote storage platforms 1950 that are accessed by device 800 over communication network 1910 via communications interface 1835. Remote storage platforms 1950 might include a server computer in a distributed computing network, such as the internet. Remote storage platforms 1950 also may include "cloud storage providers" whose data and functionality are accessible to applications through OS functions or APIs.

User interface 1850 may include an input device such as a mouse 1855, keyboard 1856, microphone 1857, track pad or touch input device 1859 for receiving a touch gesture from a user, a motion input device 1858 for detecting non-touch gestures and other motions by a user, and other types of input devices along with associated processing elements capable of receiving user input. Output devices such as display 1851, speakers 1852, haptic devices for tactile feedback and other types of output devices may be included in user interface 1850. In some embodiments, the input and output devices may be combined in a single device, such as a touchscreen display, which both depicts images and receives touch gesture input from user 1705.

Visual output may be depicted on display 1851 in several manners. Display 1851 may present graphical user interface elements, text, images, video, notifications, virtual buttons, virtual keyboards, and the like. User interface 1850 also may include associated user interface software executed by OS 1815 in support of the various user input and output devices. Such software assists OS 1815 in communicating user interface hardware events to application programs 1810 using defined mechanisms.

According to a first example process, the user of first computing device 1701 sends the email to each email recipient after the email is generated. The email is processed by host server 1703 in route to second computing device 1704. Processes associated with server 1703 may cause a sub-message to be appended to the email. For example, a company standard promotion or other information may be added to the email. A logo or graphic for the company may be added. After the sub-message is appended, the email is delivered through network 1702 to each recipient. Alternatively, a URL or any other information may be appended to the email.

Figure 8:
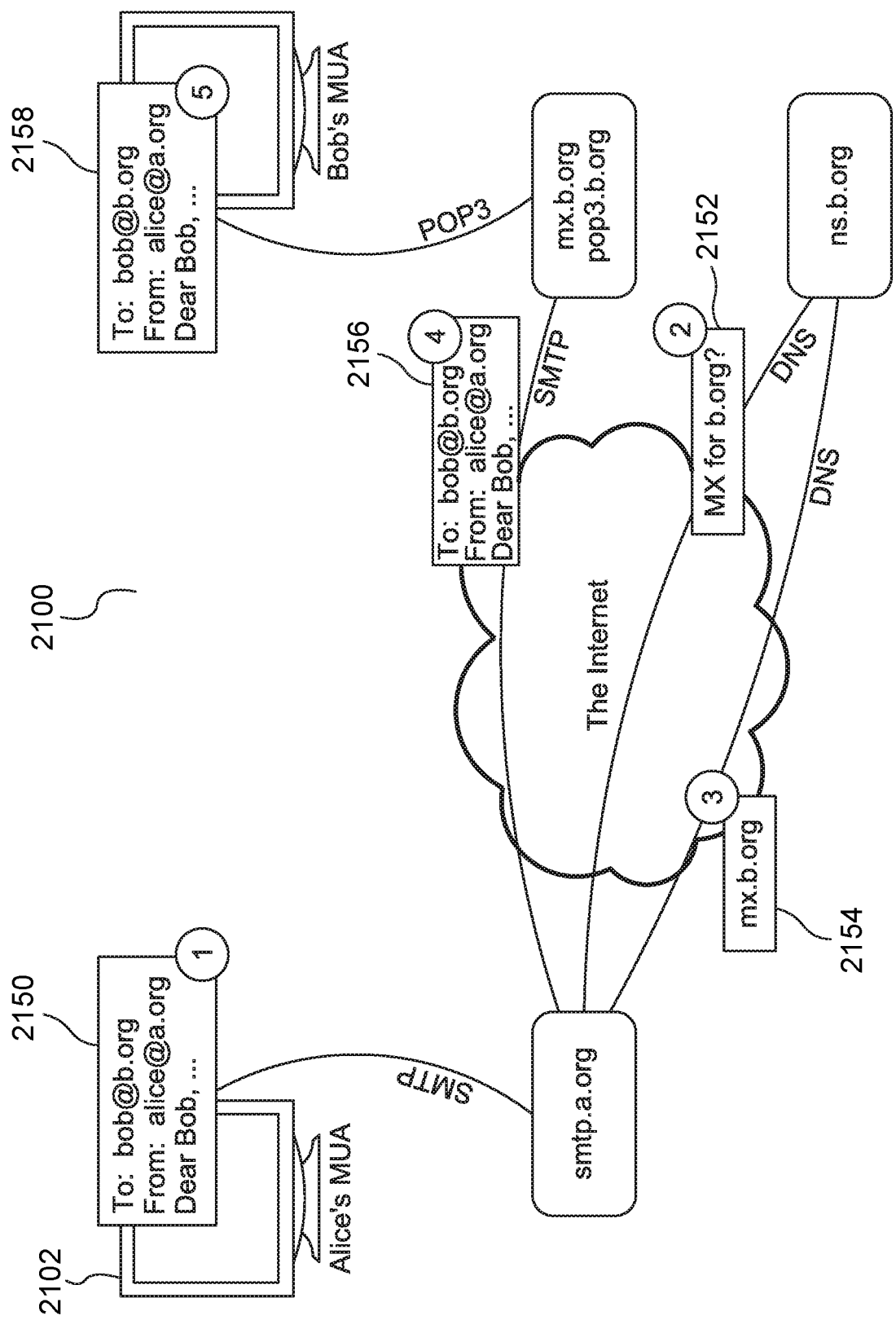
FIG. 8 illustrates a process of sending and receiving an email according to the disclosed embodiments.

This process may be shown in greater detail by FIG. 8, which disclosed a process 2100 to send and receive email. FIG. 8 depicts a sequence of events when a user sends an email message, or an electronic document, over the Internet. In block 2150, a user Alice types in, or selects from an address book, the email address of the intended recipients, types a message having information, and hits the "send" button using a mail user agent (MUA). The MUA for Alice may be a first client computer 2102. Alice's MUA formats the message into an Internet or computer network email format and may use the Simple Mail Transfer Protocol (SMTP) to send the message to the local mail transport agent (MTA), in this case smtp.a.org, managed by Alice's Internet Service Provider (ISP).

The MTA reads the destination address provided by SMTP, in the example shown as bob@b.org, and, in block 2152, looks up the associated domain name in the Domain Name System (DNS) to find the mail exchange servers accepting messages for that domain. In block 2154, the DNS server for the b.org domain, or ns.b.org, responds with a mail exchange (MX) record listing the MX servers for that domain, which in this example is mx.b.org, a server run by the recipient's ISP. In block 2156, Alice's MTA, or smtp.a.org, sends the message to mx.b.org using SMTP, which delivers it to the mailbox of user Bob (or other users, if applicable). In block 2158, Bob presses the "get mail" button in his MUA 2104 that retrieves the message using POP or another suitable protocol.

This procedure also may be used for sending electronic documents apart from emails. For example, a document may be generated asking for private information from the recipients. Upon receipt, the information is used to fill out the document, which is stored on a system connected to a network, such as a work environment. Thus, the electronic documents are not sent back as emails, but stored individually. The collection of electronic documents may be processed according to the disclosed embodiments to suppress the private information.

The disclosed embodiments may perform the functions and actions disclosed in FIGS. 5-8 using a simulated virtual user that has an email account to receive email. The email account for the simulated virtual user may act like the "Bob" account of FIG. 8. It retrieves an email as shown in block 2156.

It will be apparent to those skilled in the art that various modifications and variations can be made in the disclosed methods and systems for monitoring email transactions without departing from the spirit or scope of the invention. Thus, it is intended that the present invention covers these modifications and variations disclosed above provided that such modifications and variations come within the scope of any claims and their equivalents.

The invention claimed is:

1. A method for assessing email deliverability, in the personal email system of an email provider, for an email campaign, the method comprising the steps of:
compiling a record of a sampling of users' interactions with email over a defined period so that said record reflects the general populace's interactions with email over said defined period,
updating said record to include said users' interactions with email for times subsequent to said defined period, thereby maintaining an updated record,
utilizing said updated record to create an updated database of the expected current interactions of one with an incoming email,
generating a plurality of simulated virtual users that are configured to act as additional, email recipients for said email campaign and provide feedback on said email deliverability achieved by said email campaign,
utilizing said updated database to generate a plurality of current behavior profiles, one of which is assigned to each of said plurality of simulated virtual users, and wherein each of said plurality of current behavior profiles includes a probability of a specific email activity occurring for a received email;
creating a plurality of user profiles, and wherein one of said plurality of user profiles is assigned to each of said plurality of simulated virtual users;
creating a plurality of personal email accounts, and assigning one that includes an inbox to each of said plurality of simulated virtual users,
causing the sending to each of said plurality of personal email accounts an email from said email campaign,
simulating email activity at each of said plurality of personal email accounts in response to receiving emails and according to the assigned current behavior profile and user profile for said simulated virtual user to which each of said plurality of personal email accounts is assigned, and
monitoring said inboxes of each of said plurality of personal email accounts to determine whether an email from said email campaign was delivered to the simulated virtual user to whom said personal email account is assigned.

2. The method as recited in claim 1, wherein:
creating said plurality of user profiles includes using a plurality of demographic profiles and a plurality of sociographic profiles.

3. The method as recited in claim 2, further comprising the step of:
identifying a plurality of lists on which to register said personal email accounts, and
utilizing said plurality of lists to send to an email from said email campaign.

4. The method as recited in claim 2, wherein:
updating said record involves utilizing a machine learning algorithm.

5. The method as recited in claim 1, further comprising the step of:
identifying a plurality of lists on which to register said personal email accounts, and
utilizing said plurality of lists to send to an email from said email campaign.

6. A system for assessing email deliverability, in the personal email system of an email provider, for an email campaign, comprising:
an email interactions database of a sampling of users' interactions with email over a defined period so that said email interactions database reflects the general populace's interactions with email over said defined period,
an update of said email interactions database to include said users' interactions with email for times subsequent to said defined period,
a plurality of simulated virtual users that are configured to act as additional email recipients for said email campaign and provide feedback on said email deliverability achieved by said email campaign,
a plurality of current behavior profiles, generated by utilizing said email interactions database and update, one of which is assigned to each of said plurality of simulated virtual users, and wherein each of said plurality of current behavior profiles includes a probability of a specific email activity occurring for a received email,
a plurality of user profiles, and wherein one of said plurality of user profiles is assigned to each of said plurality of simulated virtual users,
a plurality of personal email accounts, each of which includes an inbox, and wherein one of said plurality of personal email accounts is assigned to each of said plurality of simulated virtual users, and a simulator configured to simulate email activity at each of said plurality of personal email accounts in response to receiving emails and according to the assigned current behavior profile and user profile for said simulated virtual user to which each of said plurality of personal email accounts is assigned.

7. The system as recited in claim 6, wherein:
a plurality of demographic profiles that are configured to be used to create said plurality of user profiles, and
a plurality of sociographic profiles that are configured to be further used to create said plurality of user profiles.

8. The system as recited in claim 7, further comprising:
a plurality of lists on which to register said personal email accounts.

9. The system as recited in claim 7, further comprising:
a machine learning algorithm that is configured to be used to update said email interactions database.

10. The system as recited in claim 6, further comprising:
a plurality of lists on which to register said personal email accounts.

11. The system as recited in claim 10, further comprising:
a machine learning algorithm that is configured to be used to update said email interactions database.

12. The system as recited in claim 6, further comprising:
a machine learning algorithm that is configured to be used to update said email interactions database.

13. A computer readable, non-transitory, storage medium and program code recorded thereon for execution on a computer device, said program code causing said computer device to assess email deliverability for an email campaign by performing the steps comprising:
compiling a record of a sampling of users' interactions with email over a defined period so that said record reflects the general populace's interactions with email over said defined period,
updating said record to include said users' interactions with email for times subsequent to said defined period, thereby always maintaining an updated record,
utilizing said updated record to create an updated database of the expected current interactions of one with an incoming email,
generating a plurality of simulated virtual users that are configured to act as additional, email recipients for said email campaign and provide feedback on said email deliverability achieved by said email campaign,
utilizing said updated database to generate a plurality of current behavior profiles, one of which is assigned to each of said plurality of simulated virtual users, and wherein each of said plurality of current behavior profiles includes a probability of a specific email activity occurring for a received email,
creating a plurality of user profiles and wherein one of said plurality of user profiles is assigned to each of said plurality of simulated virtual users,
creating a plurality of personal email accounts and assigning one that includes an inbox to each of said plurality of simulated virtual users,
causing the sending to each of said plurality of personal email accounts an email from said email campaign,
simulating email activity at each of said plurality of personal email accounts in response to receiving emails and according to the assigned current behavior profile and user profile for said simulated virtual user to which each of said plurality of personal email accounts is assigned, and
monitoring said inboxes of each of said plurality of personal email accounts to determine whether an email from said email campaign was delivered to the simulated virtual user to whom said personal email account is assigned.

14. The method as recited in claim 13, wherein:
updating said record involves utilizing a machine learning algorithm.

15. The computer readable, non-transitory, storage medium and program code recorded thereon as recited in claim 13, wherein:
creating said plurality of user profiles involves using a plurality of demographic profiles and a plurality of sociographic profiles.

16. The computer readable, non-transitory, storage medium and program code recorded thereon as recited in claim 15, further comprising the step of:
identifying a plurality of lists on which to register said personal email accounts, and utilizing said plurality of lists to send to an email from said email campaign.

17. The computer readable, non-transitory, storage medium and program code recorded thereon as recited in claim 13, further comprising the step of:
identifying a plurality of lists on which to register said personal email accounts, and
utilizing said plurality of lists to send to an email from said email campaign.

18. The computer readable, non-transitory, storage medium and program code recorded thereon as recited in claim 13, wherein:
updating said record involves utilizing a machine learning algorithm.

19. The computer readable, non-transitory, storage medium and program code recorded thereon as recited in claim 13, wherein:
updating said record involves utilizing a machine learning algorithm.

20. The computer readable, non-transitory, storage medium and program code recorded thereon as recited in claim 13, wherein:
updating said record involves utilizing a machine learning algorithm.

\* \* \* \* \*